Nov. 14, 1944.　　A. H. GOREY ET AL　　2,362,813
PHOTOGRAPHIC CAMERA PARTICULARLY ADAPTED FOR AERIAL PHOTOGRAPHY
Filed April 1, 1942　　19 Sheets-Sheet 1

INVENTORS.
Archie H. Gorey,
Louis D. Nadel,
Edson S. Hineline.
BY
ATTORNEYS

Nov. 14, 1944.  A. H. GOREY ET AL  2,362,813
PHOTOGRAPHIC CAMERA PARTICULARLY ADAPTED FOR AERIAL PHOTOGRAPHY
Filed April 1, 1942  19 Sheets-Sheet 2

INVENTORS
Archie H. Gorey
Louis D. Nadel
Edson S. Hineline
ATTORNEYS.

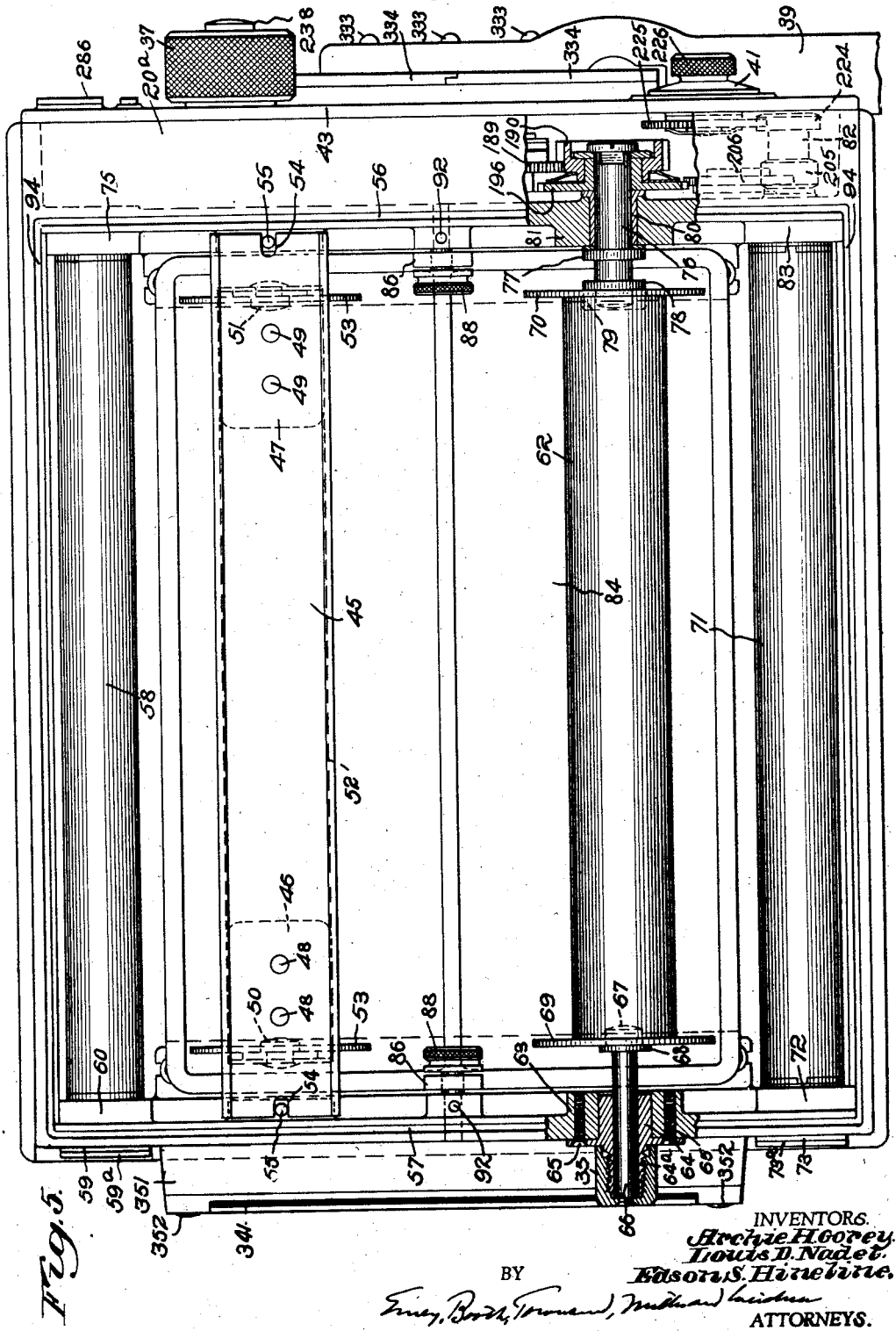

Nov. 14, 1944.   A. H. GOREY ET AL   2,362,813
PHOTOGRAPHIC CAMERA PARTICULARLY ADAPTED FOR AERIAL PHOTOGRAPHY
Filed April 1, 1942   19 Sheets-Sheet 4
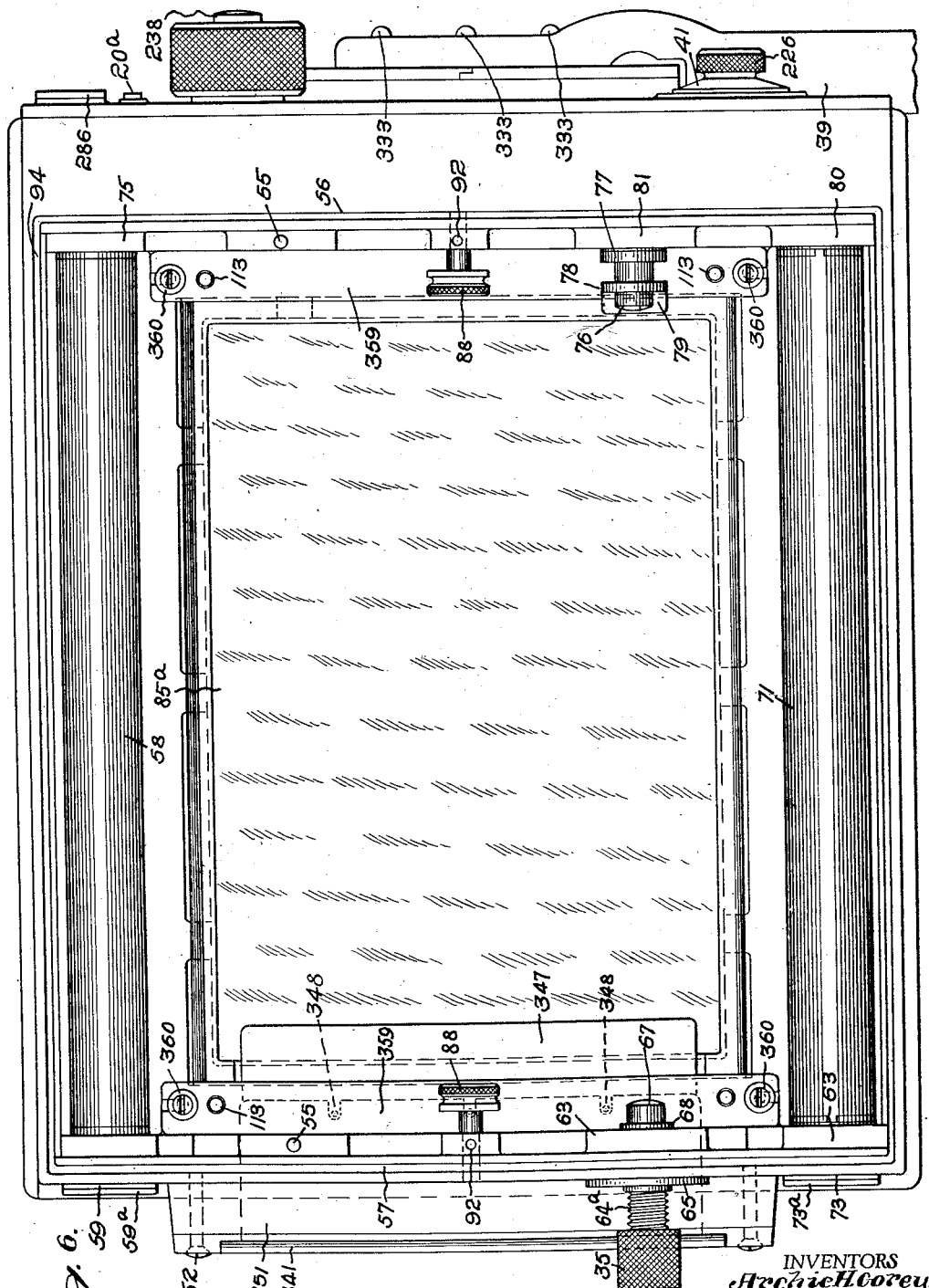
INVENTORS
Archie H. Corey
Louis D. Nadel
Edson S. Hineline
BY
ATTORNEYS.

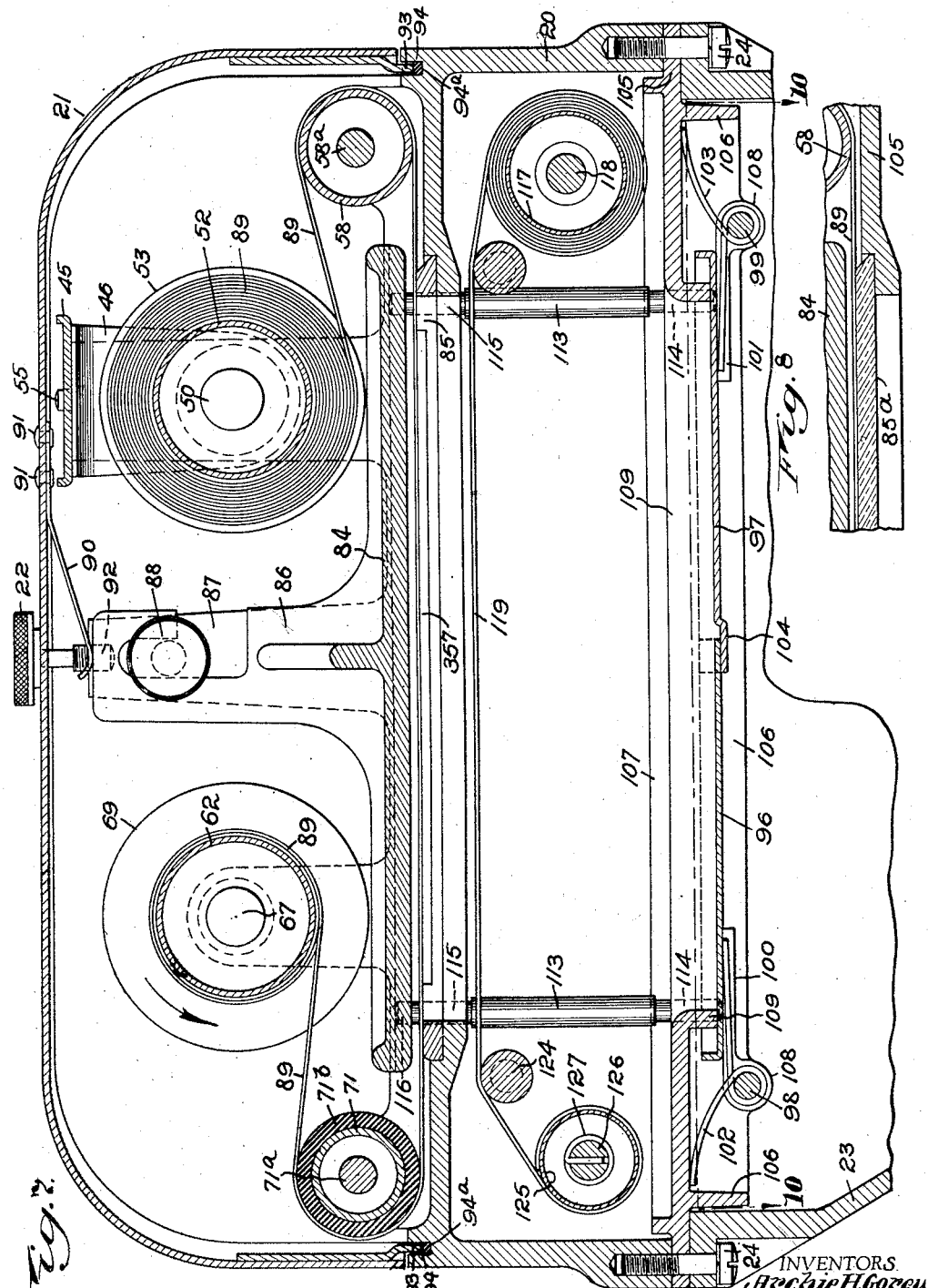

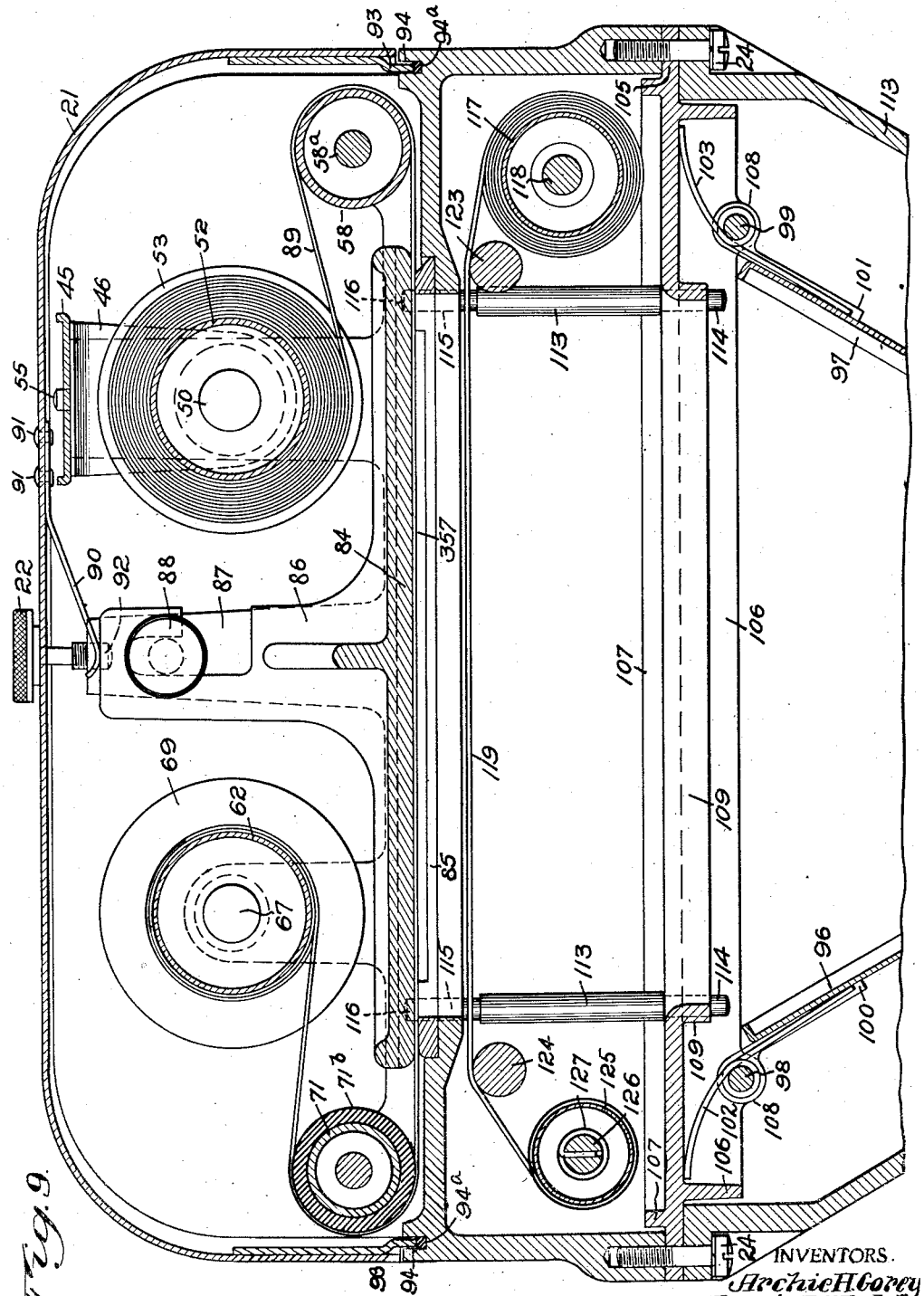

Nov. 14, 1944.  A. H. GOREY ET AL  2,362,813
PHOTOGRAPHIC CAMERA PARTICULARLY ADAPTED FOR AERIAL PHOTOGRAPHY
Filed April 1, 1942  19 Sheets-Sheet 7
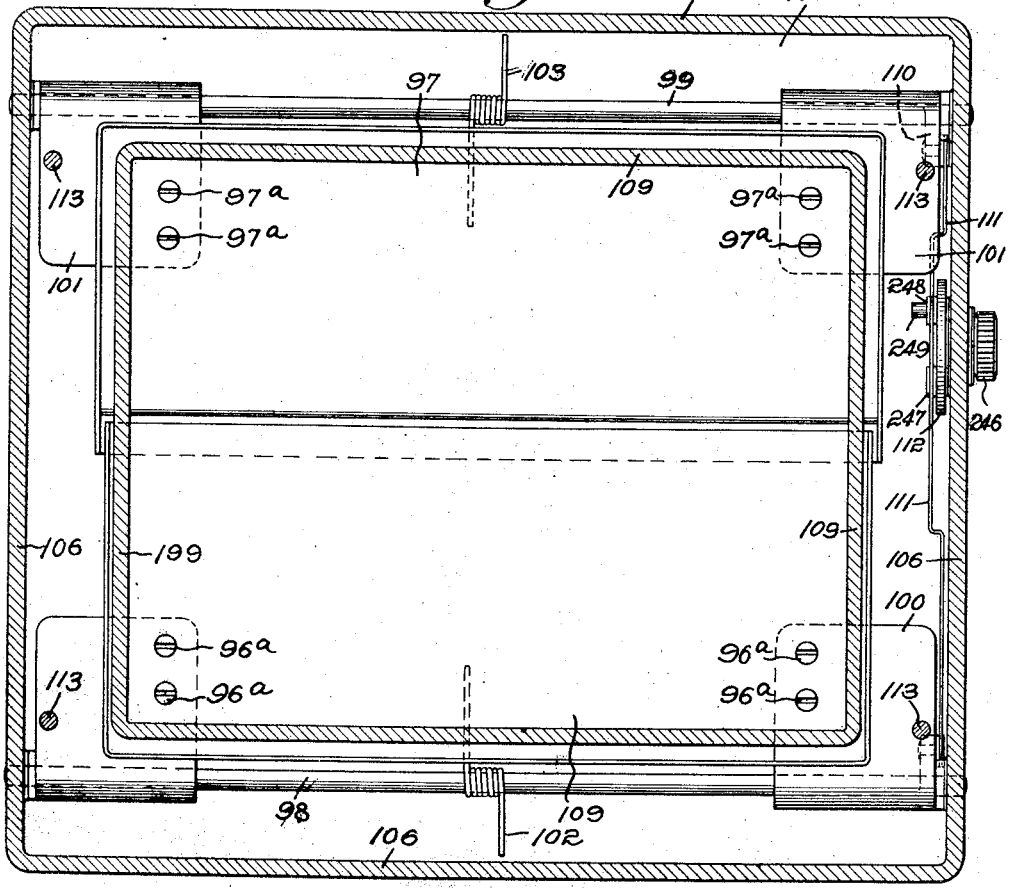
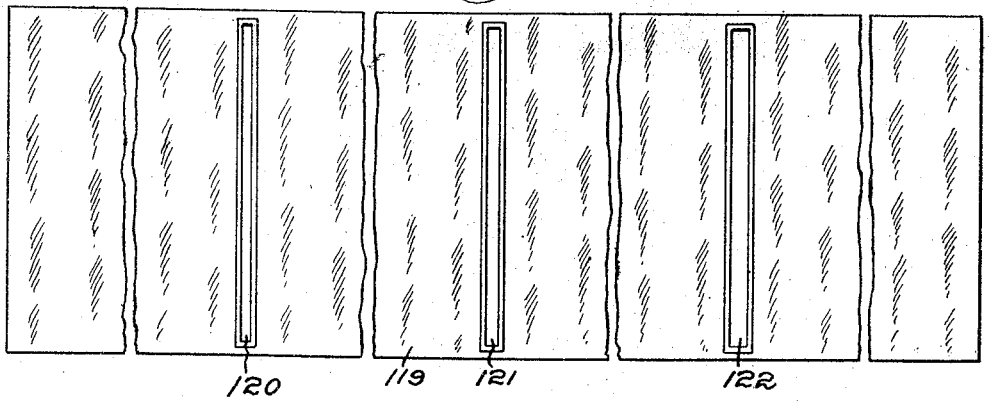

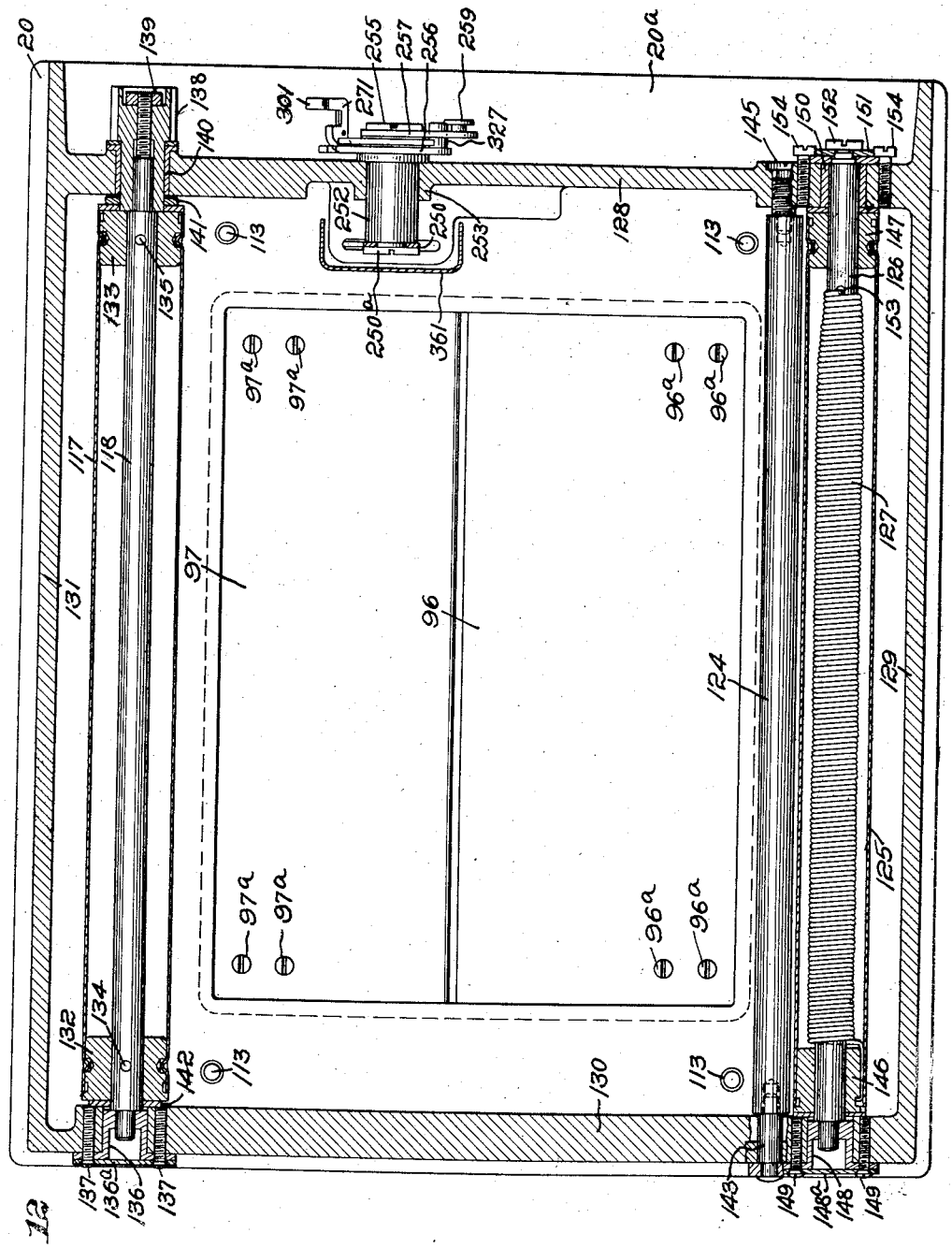

Nov. 14, 1944.　　A. H. GOREY ET AL　　2,362,813
PHOTOGRAPHIC CAMERA PARTICULARLY ADAPTED FOR AERIAL PHOTOGRAPHY
Filed April 1, 1942　　19 Sheets-Sheet 9

INVENTORS:
Archie H. Gorey,
Louis D. Nadel.
Edson S. Hineline.
BY
Attys.

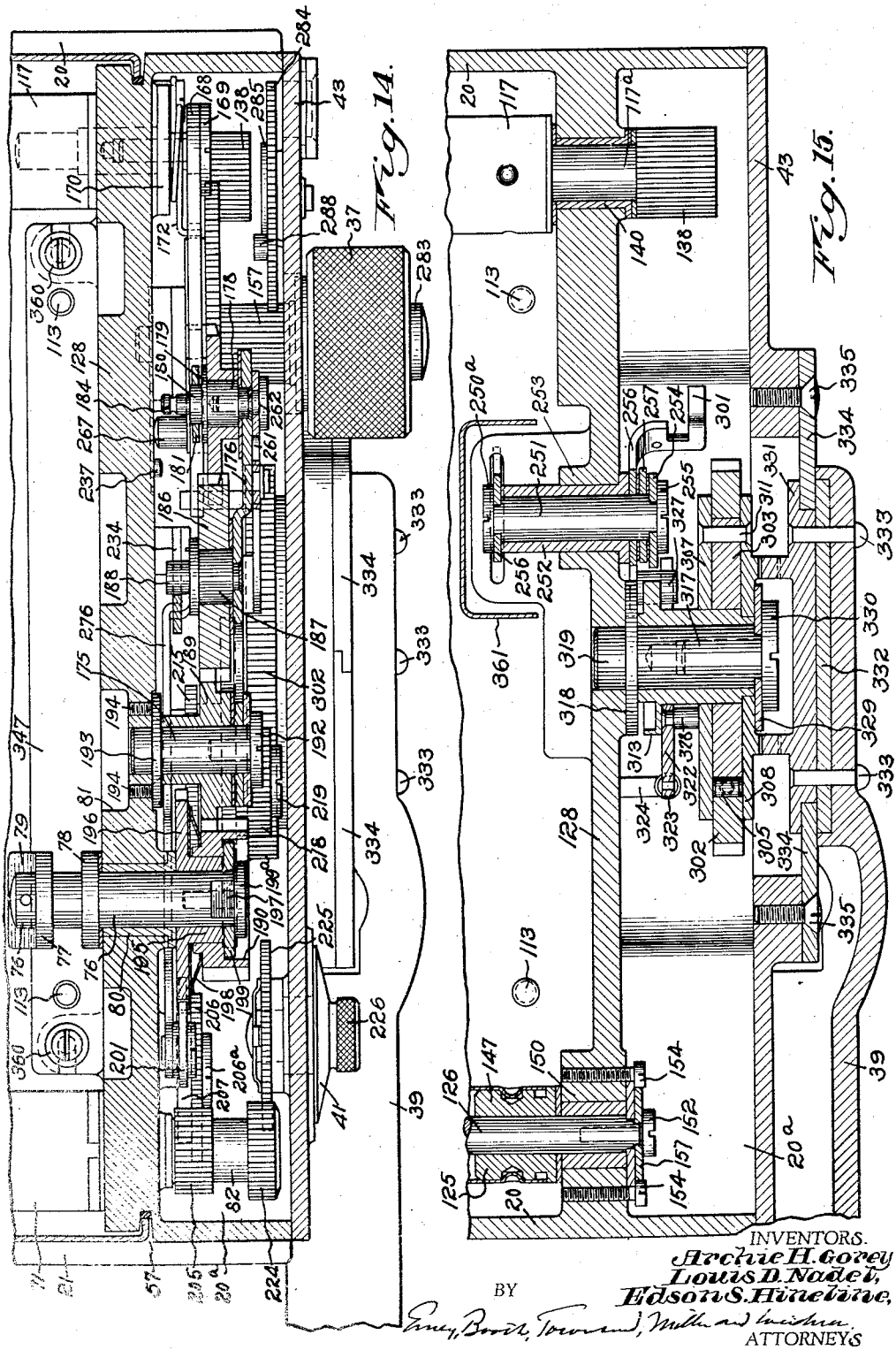

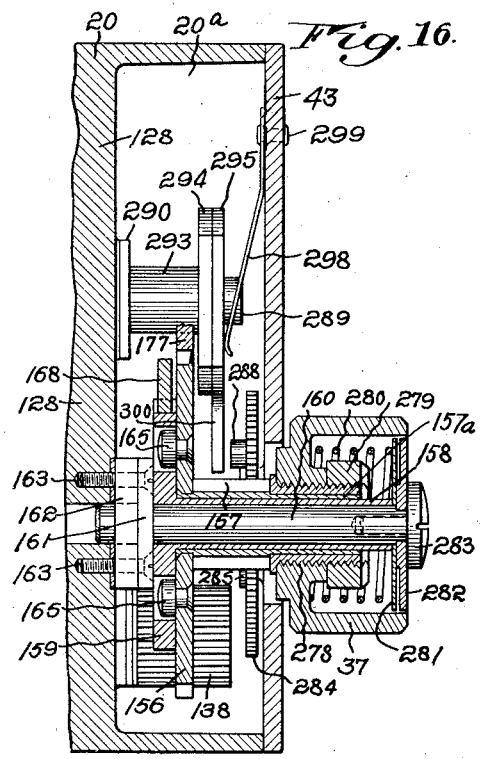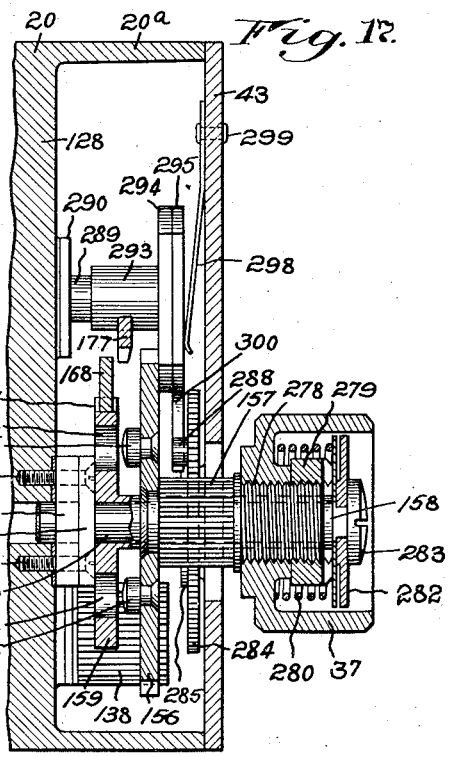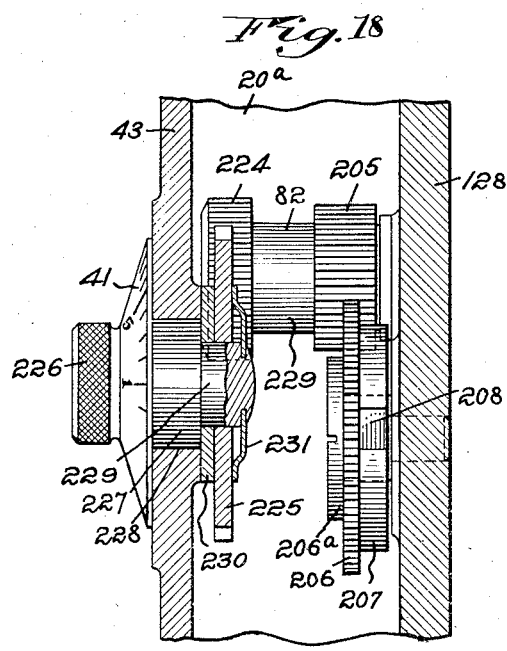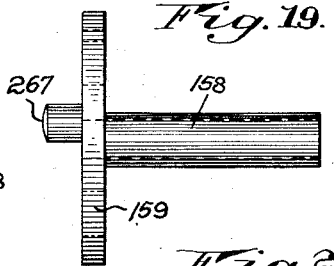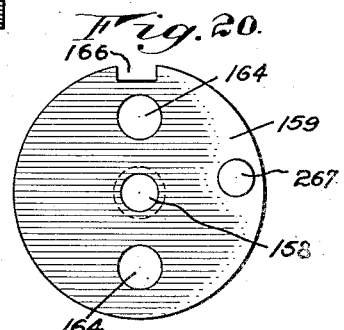

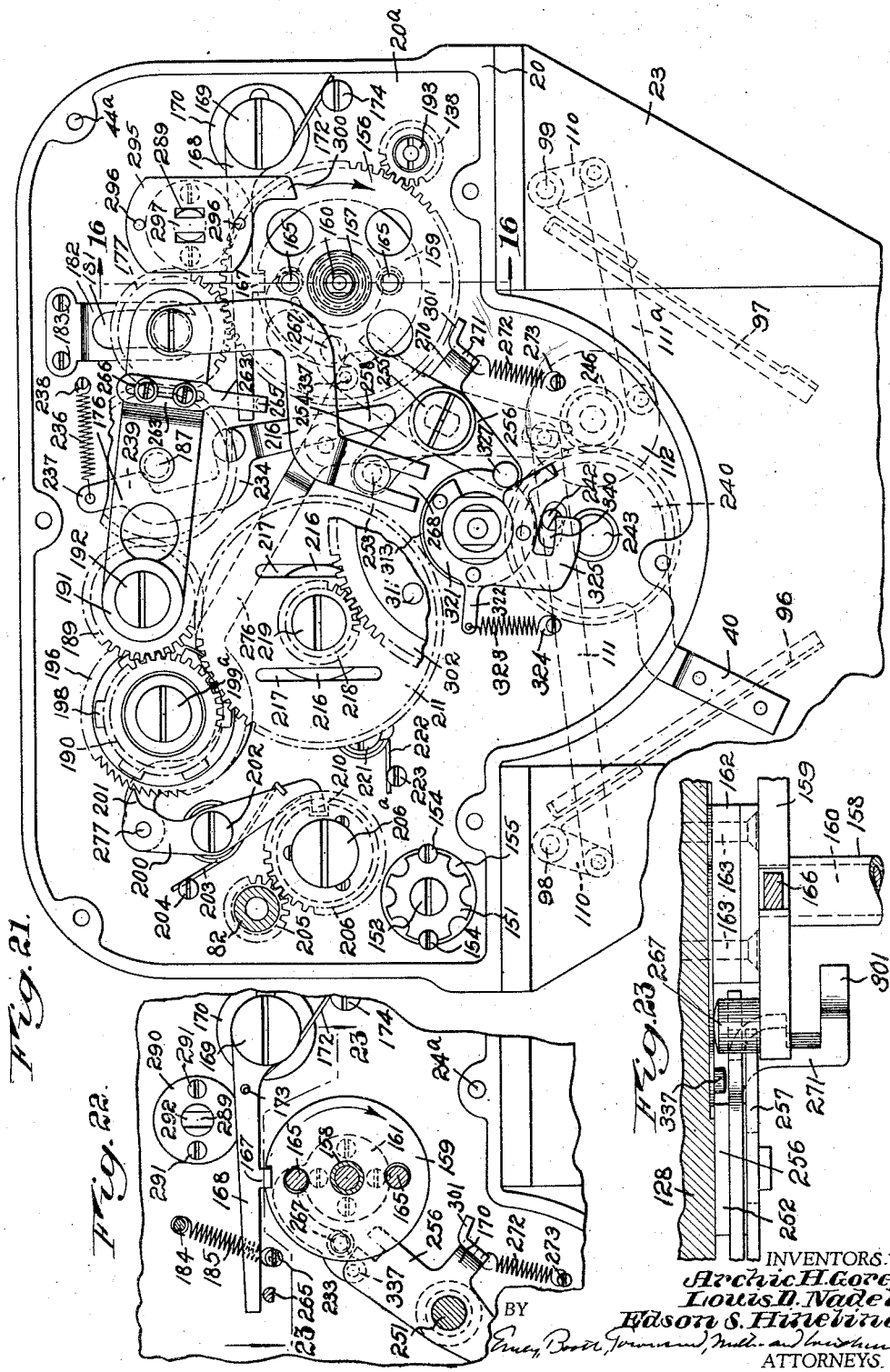

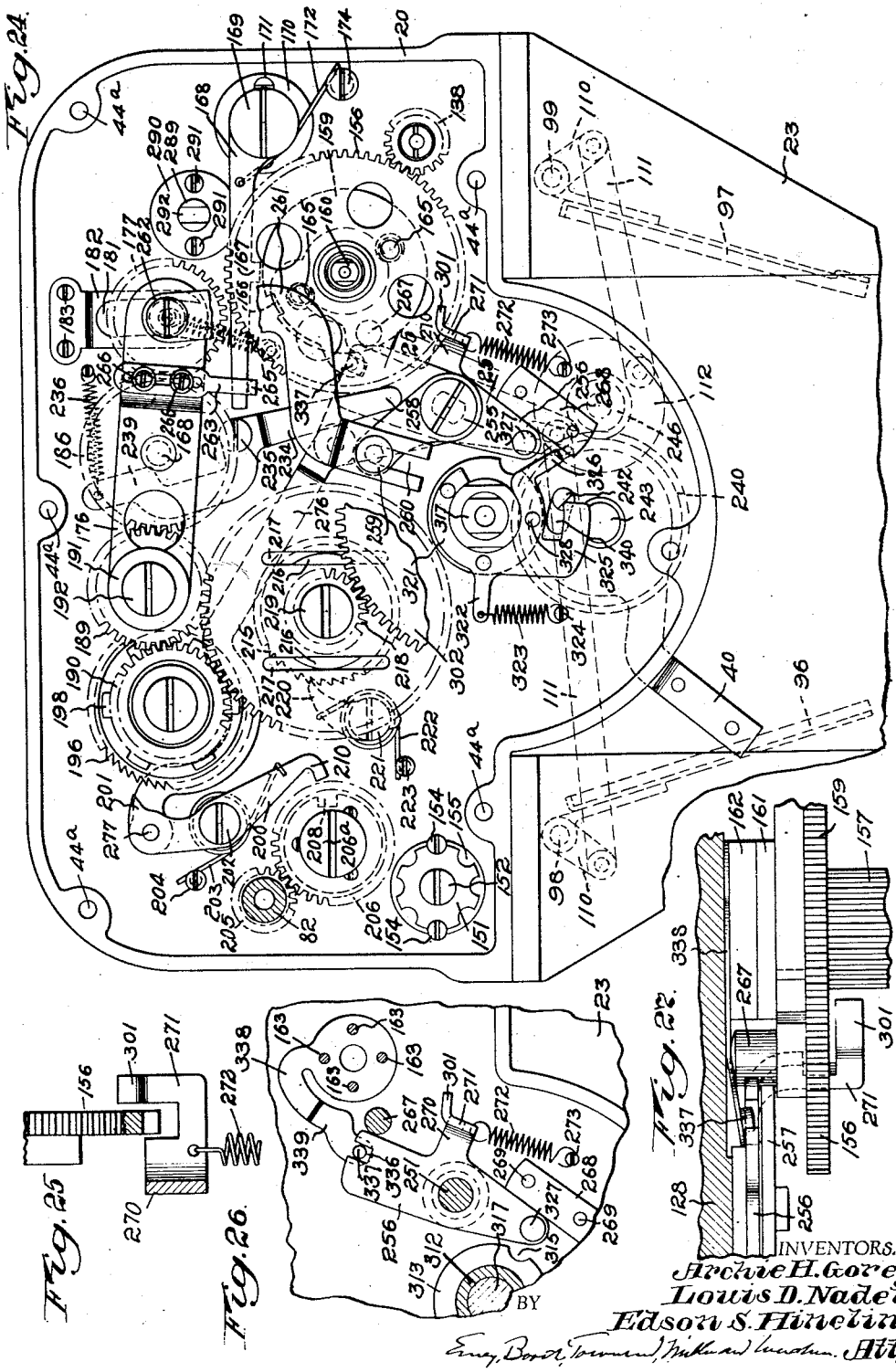

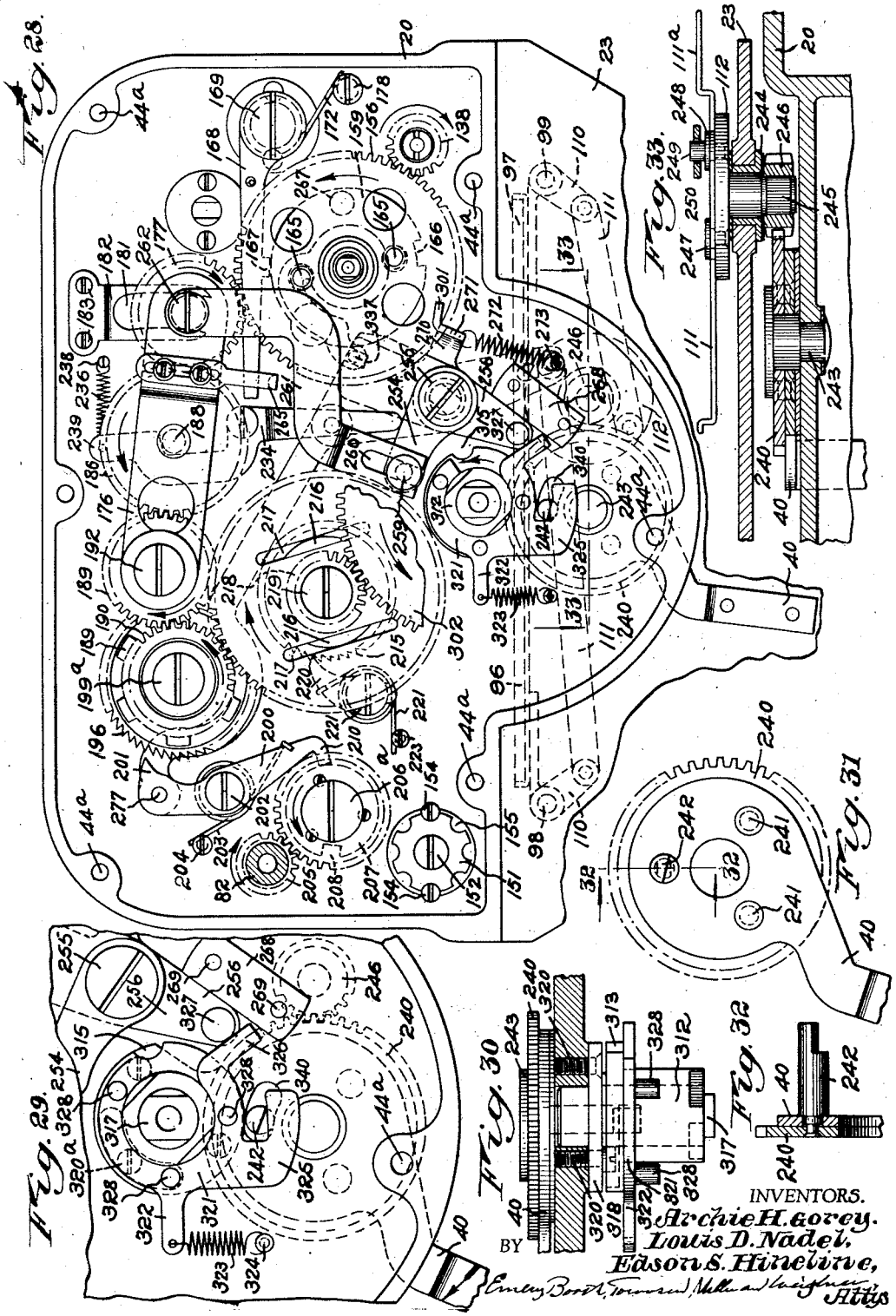

Nov. 14, 1944.   A. H. GOREY ET AL   2,362,813
PHOTOGRAPHIC CAMERA PARTICULARLY ADAPTED FOR AERIAL PHOTOGRAPHY
Filed April 1, 1942   19 Sheets-Sheet 16

INVENTORS
Archie H. Gorey,
Louis D. Nadet,
Edson S. Hineline.
BY
Attys

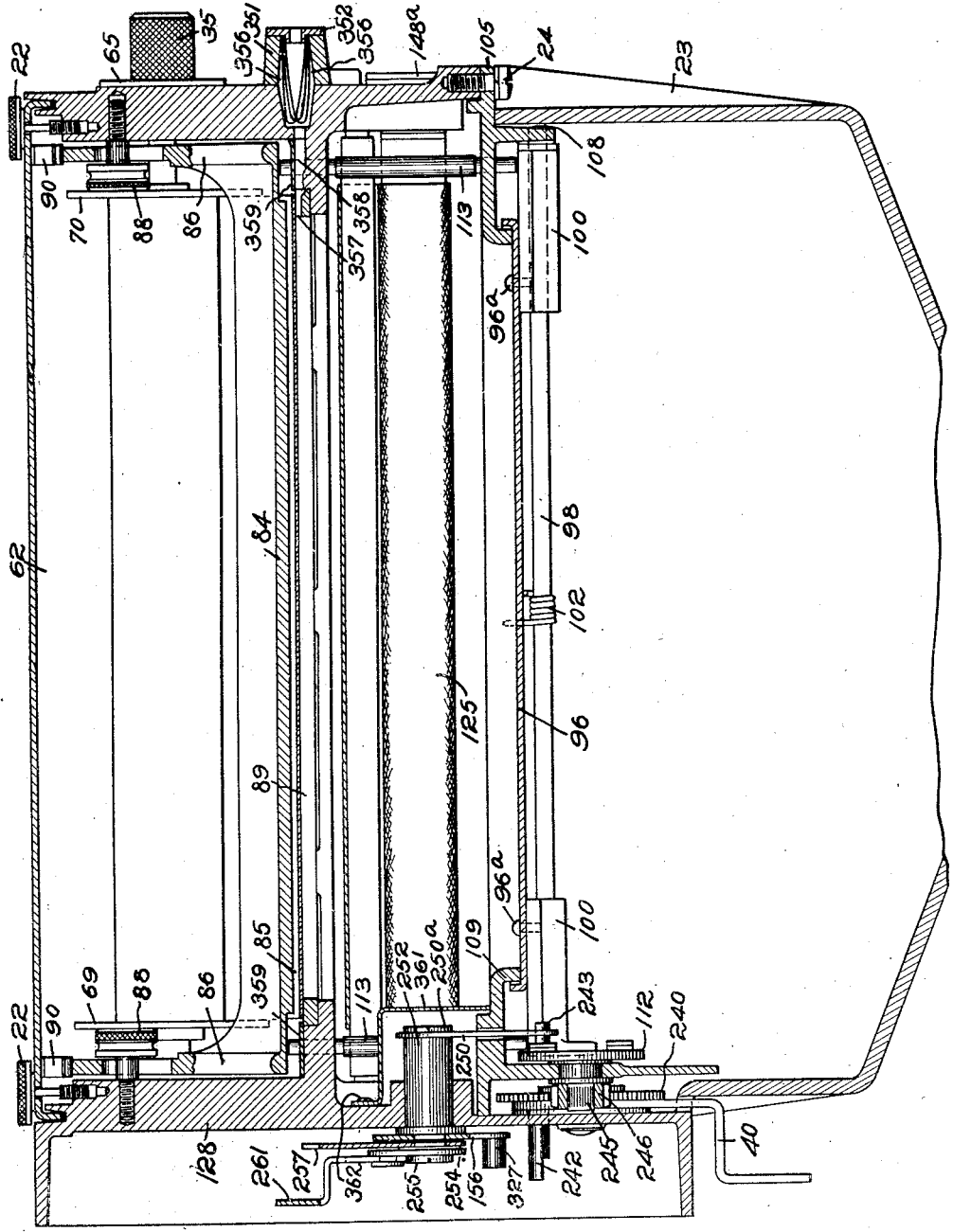

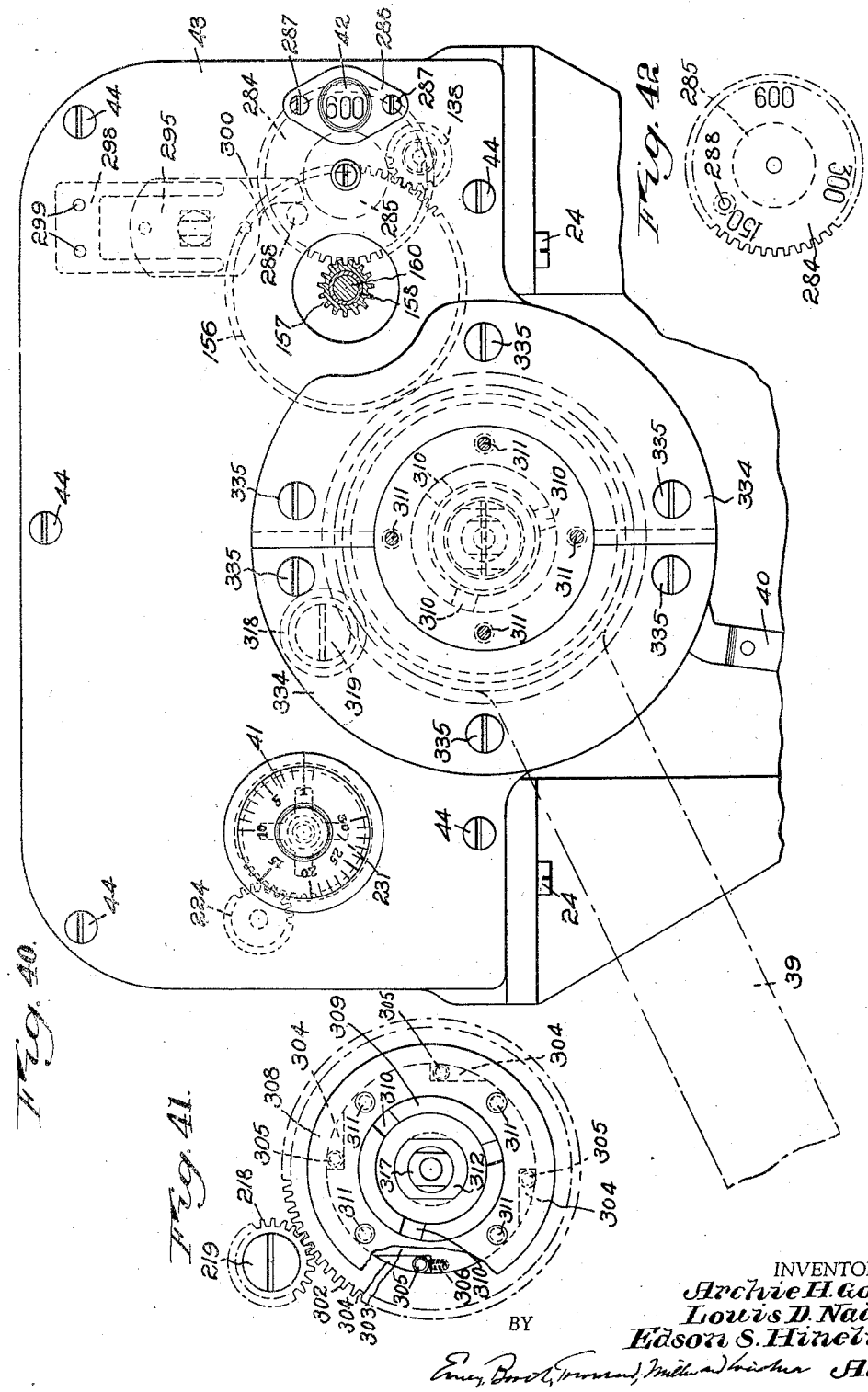

Nov. 14, 1944.　　　　A. H. GOREY ET AL　　　　2,362,813
PHOTOGRAPHIC CAMERA PARTICULARLY ADAPTED FOR AERIAL PHOTOGRAPHY
Filed April 1, 1942　　19 Sheets-Sheet 19
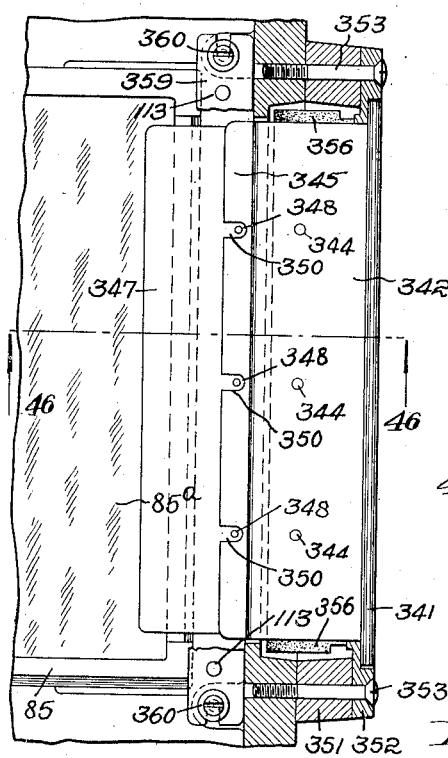
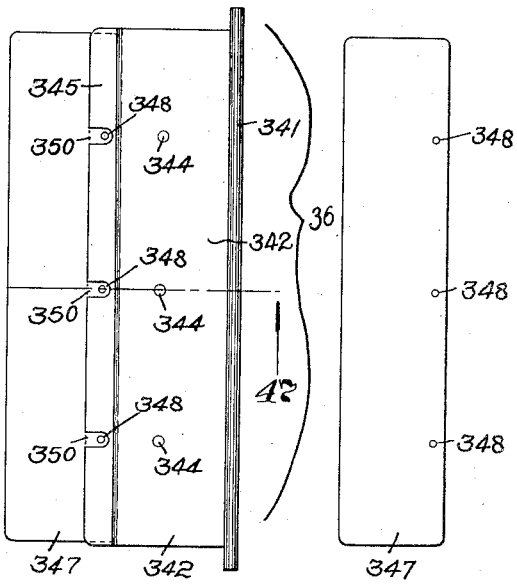
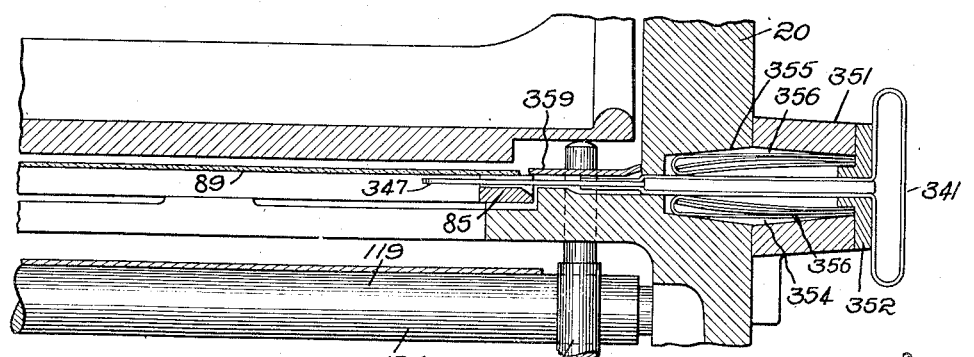
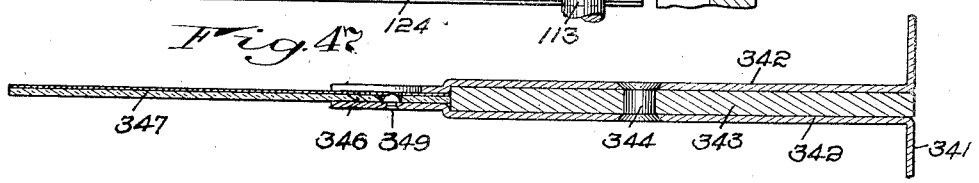
INVENTORS
Archie H. Gorey,
Louis D. Nadel,
Edson S. Hineline.
BY
ATTORNEYS Patented Nov. 14, 1944

2,362,813

UNITED STATES PATENT OFFICE 2,362,813

PHOTOGRAPHIC CAMERA PARTICULARLY ADAPTED FOR AERIAL PHOTOGRAPHY

Archie H. Gorey, Louis D. Nadel, and Edson S. Hineline, Rochester, N. Y., assignors to The Folmer Graflex Corporation, Rochester, N. Y., a corporation of Delaware Application April 1, 1942, Serial No. 437,240

98 Claims. (Cl. 95—34)

This invention relates to a camera particularly adapted to aerial photography such as used by the military forces of the United States of America.

In order that the principle of the invention may be readily understood, we have disclosed a single embodiment thereof in the accompanying drawings, wherein Fig. 1 is a front elevation of the camera showing the position of the stationary handle, and of the operating handle when in position ready for making an exposure;

Fig. 5 is a top view of the camera with the magazine cover removed and certain parts of the casting or camera body having been cut away to show the mounting of the take-up spool drive, the measuring roll and counter drive gears being shown in dotted lines;

Fig. 6 is a top plan view similar to Fig. 5 but with the film pressure pad, film spools, and film spool bracket removed to show the exposure aperture, the film recording tab being also shown;

Fig. 7 is a section taken through the camera, showing the mounting of the film spools, the shutter curtain rolls, the pressure pad, and the capping gates, the latter being in a closed condition;

Fig. 8 is a fragmentary detail in section similar to Fig. 7, but showing a glass pressure plate used instead of the open exposure aperture plate;

Fig. 9 is a view similar to Fig. 7, but showing the capping gates in a partially open condition;

Fig. 10 is a horizontal section looking toward the lens, taken on the line 10—10 of Fig. 7, showing the mounting of the capping gates and the mechanism for operating them;

Fig. 11 is a detail of the shutter curtain, showing its several apertures;

Fig. 12 is a horizontal section through the camera body taken on the line 12—12 of Fig. 13, showing the construction of the curtain rolls;

Fig. 14 is a section through the mechanism housing, taken on the line 14—14 of Fig. 13;

Fig. 15 is a partial horizontal section taken through Fig. 13 on the line 15—15 thereof with some of the parts removed;

Fig. 16 is a partial vertical section taken through Fig. 21, on the line 16—16 thereof, showing shutter seting mechanism when in the set or ready condition;

Fig. 17 is a view similar to Fig. 16, but with the shutter setting knob moved to the right to permit the selection of another curtain aperture;

Fig. 18 is a partial horizontal section through the camera mechanism housing, upon an enlarged scale, to show the construction of the film exposure counter;

Fig. 19 is a detail of the curtain latch member;

Fig. 20 is a left hand elevation of Fig. 19;

Fig. 21 is a view similar to Fig. 13, but with the camera release trigger partially moved in a direction to release the shutter, the capping gates being partially open, but the curtain not yet released;

Fig. 22 is a fragmentary view similar to Fig. 21, but having some of the parts removed to show more clearly the shutter latching means and one of the interlocks;

Fig. 23 is a fragmentary detail partially in section, taken on the line 23—23 of Fig. 22, showing one of the interlocks;

Fig. 24 is a view similar to Fig. 21, but with the shutter release member moved a sufficient distance to open fully the capping gates, disengage the winding gear, and release the shutter;

Fig. 25 is a detail partially in section of Fig. 24 on the line 25—25 thereof;

Fig. 26 is a fragmentary view similar to Fig. 24, but having some of the parts removed to show more clearly the operation of one of the rewind interlocks when the mechanism is in the condition shown in Fig. 24;

Fig. 27 is a view similar to Fig. 23, but shows the interlock as it appears when the mechanism is in the condition shown in Fig. 24;

Fig. 28 is a view similar to Fig. 24, but representing the shutter release trigger as having returned to the starting position, allowing the capping gates to be closed and allowing the winding gear to be engaged prior to rewinding the shutter for another exposure;

Fig. 29 is a fragmentary detail similar to Fig. 28, on an enlarged scale, and showing the position of the shutter release lever interlock when the mechanism is in the condition shown in Fig. 28;

Fig. 30 is a partial horizontal section taken through Fig. 29, to show more clearly the construction of the trigger interlock mechanism;

Fig. 31 is a detail of the shutter release member and capping gate driving gear;

Fig. 32 is a detail, partially in section, taken through Fig. 31 on the line 32—32 thereof;

Fig. 33 is a horizontal section taken through Fig. 28 on the line 33—33 thereof, and showing the capping gate operating gears;

Fig. 39 is a vertical section through the camera, showing the capping gate operating mechanism, the pressure pad mechanism and the position of the several related parts;

Fig. 40 is a right hand elevation of the camera with a portion of the cone broken away and the operating handle removed, and showing the exposure counter dial, the shutter setting indicator opening, the shutter rewind and shutter setting gears being shown in dotted lines, the position of the operating handle when the shutter is in condition for operating being indicated in dotted lines;

Fig. 41 is a detail, partially in section, showing the camera rewind gear and driving clutch;

Fig. 42 is a detail of the exposure setting gear;

Fig. 43 is a partial horizontal section through the camera, taken at the focal plane, to show the position of the exposure recording tab and holder;

Fig. 44 is a top plan view of the exposure recording tabe holder with a recording tab in place;

Fig. 45 is a detail in elevation of the recording tab;

Fig. 46 is a section on an enlarged scale, taken through Fig. 43 on the line 46—46 thereof, showing the position of the identifying tab when in place prior to making an exposure; and Fig. 47 is a cross section on an enlarged scale of Fig. 44 taken on the line 47—47 thereof, showing the construction of the recording tab holder, a recording tab being in place.

Figure 1:
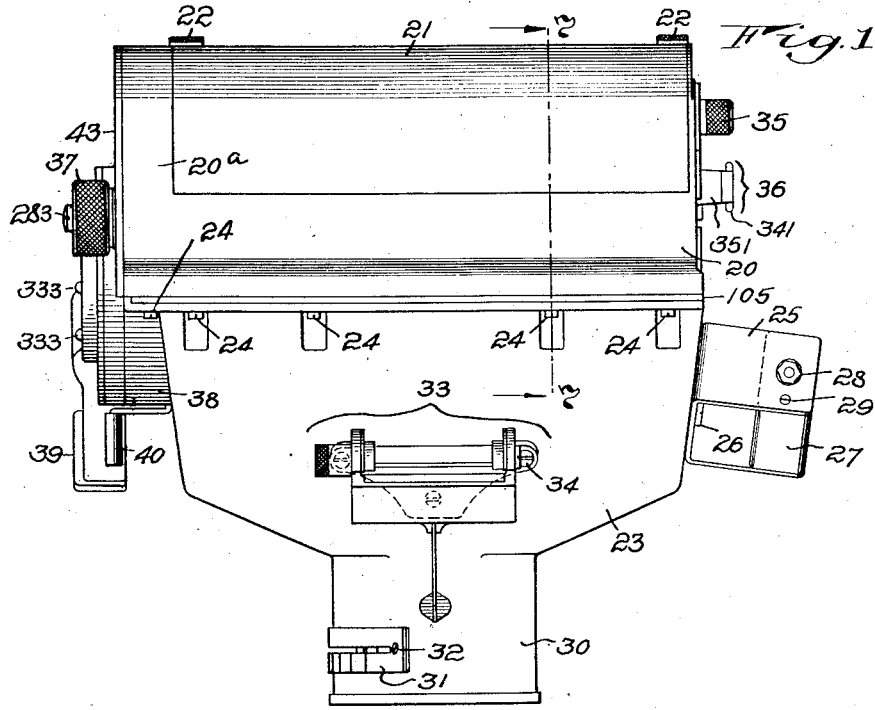

One object of this invention is to provide a camera that is small and compact and light in weight consistent with the picture size; and other objects of the invention are; to provide an aerial camera that is practically fool-proof in operation in that the operator must carry out a proper manipulation to make a photograph, in that he must completely wind the film for the next exposure area and rewind the shutter before the exposure can be made, a second operation of the exposure release lever being impossible until the film has been wound and the shutter curtain rewound; to provide an aerial camera having mechanism for rapidy rewinding the shutter and advancing the film for a second exposure, with interlocking means to insure the proper positioning of the film and the shutter curtain before an exposure can be made; to provide a wide range of shutter speeds, with means for readily changing such speeds; to provide film measuring means that is simple in construction and accurate in its function; to provide an aerial camera that can be easily loaded or unloaded, such process being simple enough to be capable of being carried out in total darkness with absolute accuracy; to provide a simple exposure counter that is easily manipulated and accurate in performance; to provide an aerial camera with means for holding the film in contact with the exposure aperture during the time of exposure, the film positioning means being at all other times out of contact with the film; to provide an aerial camera so simple in construction that it can readily be repaired by one of ordinary intelligence and with the use of very simple equipment; and also to provide means to record identification data on the negative at the time of making an exposure. The camera herein disclosed meets all of these objects in actual operation under conditions constituting very severe tests.

Referring first to Figs. 1, 2, 3 and 4, therein is disclosed the outside of the camera structure wherein the camera body or housing is indicated at 20 and is provided with a mechanism-housing 20a. The camera body is provided with a film-chamber cover 21 held to the camera body 20 by knurled head screws 22, 22. Attached to said camera body 20 is a lens cone member 23 by means of screws 24, 24, and to one side of the said cone member is attached a stationary handle structure consisting in part of a bracket 25 attached to the said lens cone member 23 by screws 26, 26. Attached to the said handle bracket 25 is a h ndle 27 held to said bracket 25 by means of a screw bolt 28, and it is kept from turning by means of screw 29. The lens cone member 23 is also provided with the usual lens shade member 30 to which is attached a diaphragm scale 31 by means of screws 32, 32. Also attached to said lens cone member 23 is a direct vision view finder 33 preferably of the usual direct vision type, and it is held to the lens cone member 23 by screws 34, 34.

Protruding from the right hand side of the camera body 20, viewing Fig. 1, is a take-up spool pivot locking member or cap 35. Also protruding from the said right hand side of the camera body is a film recording tab holder indicated generally at 36. Protruding from the left hand side of the camera body 20, viewing Fig. 1, is a shutter speed control knob 37 and a handle boss member 38 to which latter is attached a shutter operating handle 39. Extending from said protruding boss member 38 is a shutter release lever or trigger 40. The means for attaching the shutter operating handle 39 will be referred to in full detail at a later part of this description.

Figure 3:
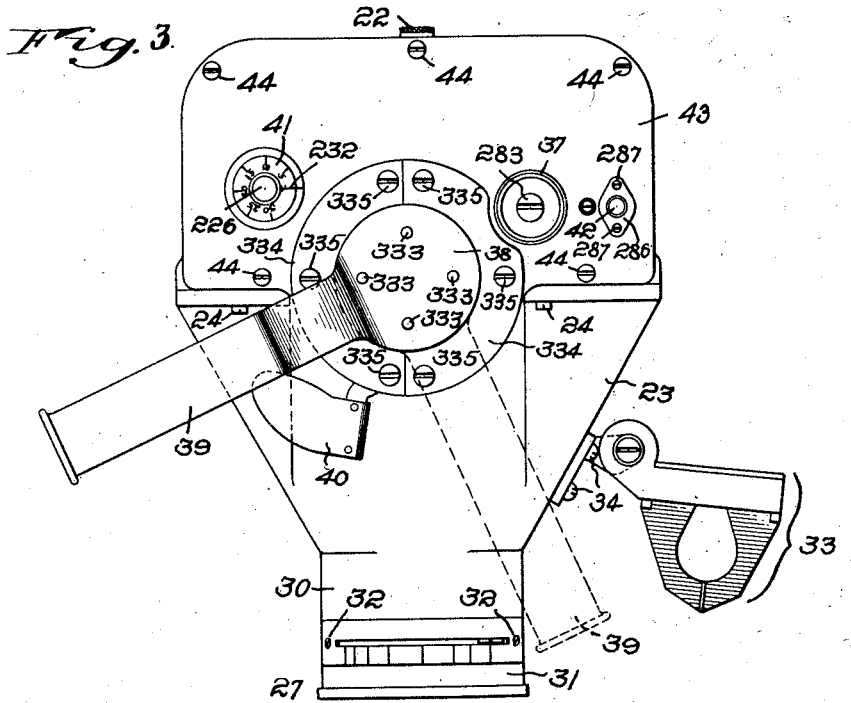
Fig. 3 is a right side elevation of the camera showing the shutter rewind handle in position ready for making an exposure, the position of the shutter release trigger being also shown and the forward position of the shutter operating handle being indicated in dotted lines, which is the position of the shutter rewind handle when it has been moved all the way forward.
Figure 4:
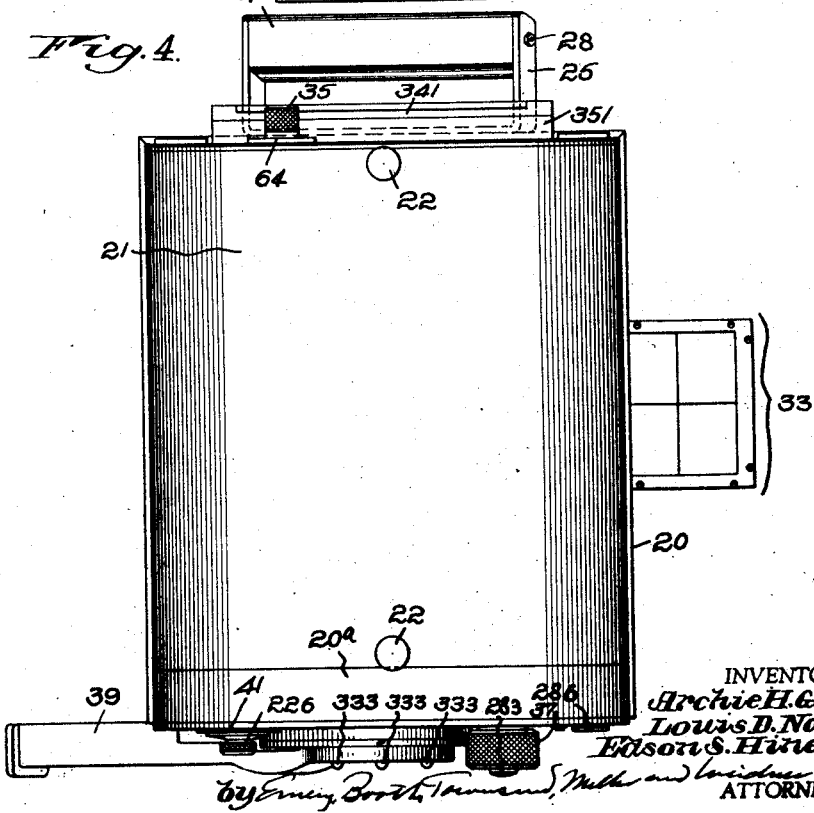
Fig. 4 is a top plan view of Fig. 1.

Referring to Fig. 3, wherein the camera is viewed from the right hand side, an exposure-counter dial is indicated at 41, a window for viewing the shutter setting guide at 42, and the mechanism-housing cover at 43, the latter being held to the camera body 20 by screws 44, 44.

In Fig. 5, the camera body 20 is shown in top plan view with the cover 21 removed. Therein is shown a supply spool bracket 45 made up of a channel member to which is attached on either end L-shaped members 46, 47, shown in dotted lines in Fig. 5, and in full lines in Fig. 7. The L-shaped member 46 is attached to the channel member or bracket 45 by rivets 48, 48, and the L-shaped member 47 is attached to said channel member or bracket 45 by rivets 49, 49. The structure of the spool support member 46 is best shown in Figs. 5, 7 and 9, wherein it clearly appears that the spool support members 46 and 47 are provided with pivot members 50, 51 for engaging holes in the supply spool 52, which has the usual flanges 53, 53 and the usual core member, shown in dotted lines in Fig. 5 and in section in Figs. 7 and 9. The said channel member or bracket 45 is provided with notches 54, 54 on either end thereof for engaging pins 55, 55 located in the camera body end members, and is kept in place when in operation by the said cover 21.

Figure 2:
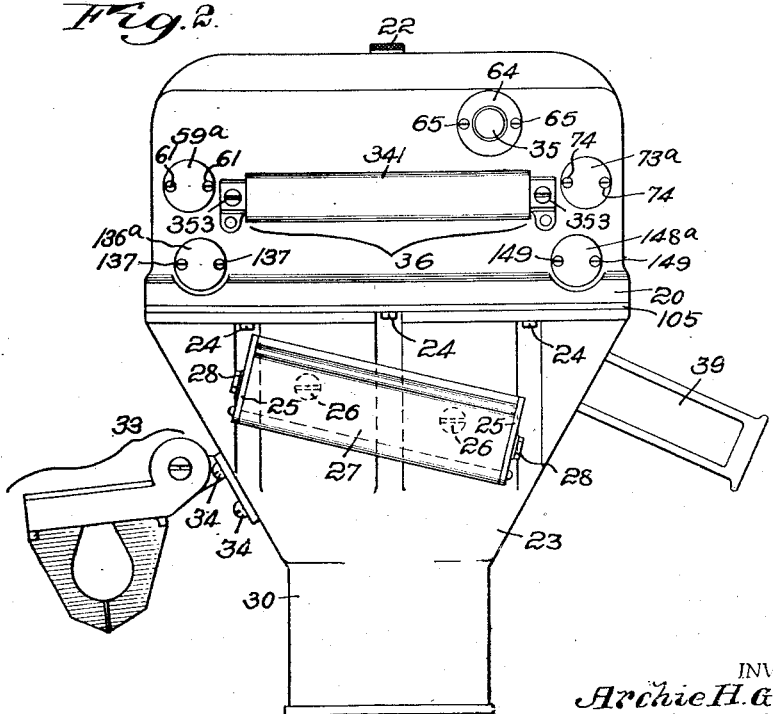
Fig. 2 is a left side elevation of Fig. 1, showing the position of the identification holder when in place for making an exposure.

Viewing Fig. 5, the right hand camera body side member is of a box-like structure indicated at 20a and it contains the shutter and the film rewind mechanism. A groove 56 is provided on its inner edge so as to be engaged by the said cover 21 when the latter is in place. The left hand side member of the camera body 20 is of a plate-like structure and is provided with a groove 57 for a similar purpose. The said side members are provided with a series of bosses for supporting the film idler roller, the film take-up spool and the film measuring roller. The said film idler roller is indicated at 58 and is provided with a through shaft 58a, shown in Fig. 7, one end whereof is fitted into a bearing 59 having a cover plate 59a. The said bearing 59 is fitted into a boss 60 and is held to the camera wall by screws 61, 61, as shown in Fig. 2. The film take-up spool is indicated at 62 and is supported at the left hand end by means of a collapsible film spool support fitted into the boss 63 of the left hand end member of the camera body or housing, being made up of a bushing 64 having a threaded extension 64a. It is held to the left hand side member by means of screws 65, 65, and threaded onto the threaded portion or extension 64a is the pivot locking member or cap 35 previously referred to and to which is attached a rod or pivot member 66 by riveting or in any other well known manner, it having an enlarged end 67 for engaging a hole in the flange 69 of the spool 62 and also having a flange or hub 68 to retain the said take-up spool 62, the opposite end of the latter being provided with a second flange 70.

The film measuring roller is indicated at 71 and is provided with a through shaft 71a shown in Fig. 7, and at the left hand end of said shaft 71a is provided for fitting into a boss 72, a bushing 73 having a dust cap 73a, said bushing and dust cap being held to the camera wall by means of screws 74, 74, Fig. 2. If desired, the said measuring rollers 71 may be provided with a rubber surface 71b, shown in Fig. 9. The right hand end of the film idler roller 58 is provided with a bearing structure, viewing Fig. 5, and is fitted into a boss 75 in substantially the same manner as at the left hand end of said roller 58. The right hand end of the film take-up spool 62 is supported on the shaft 76 having a flange 77, a second flange or hub 78 and a key 79 for engaging a slot in the flange 70 of said film take-up spool 62. The said shaft 76 is supported in a bushing 80 fitted into a boss 81 on the right hand side member of the camera mechanism or housing 20a, and onto said shaft 76 is fitted a clutch and driving member described in detail at a subsequent part of the specification.

Figure 13:
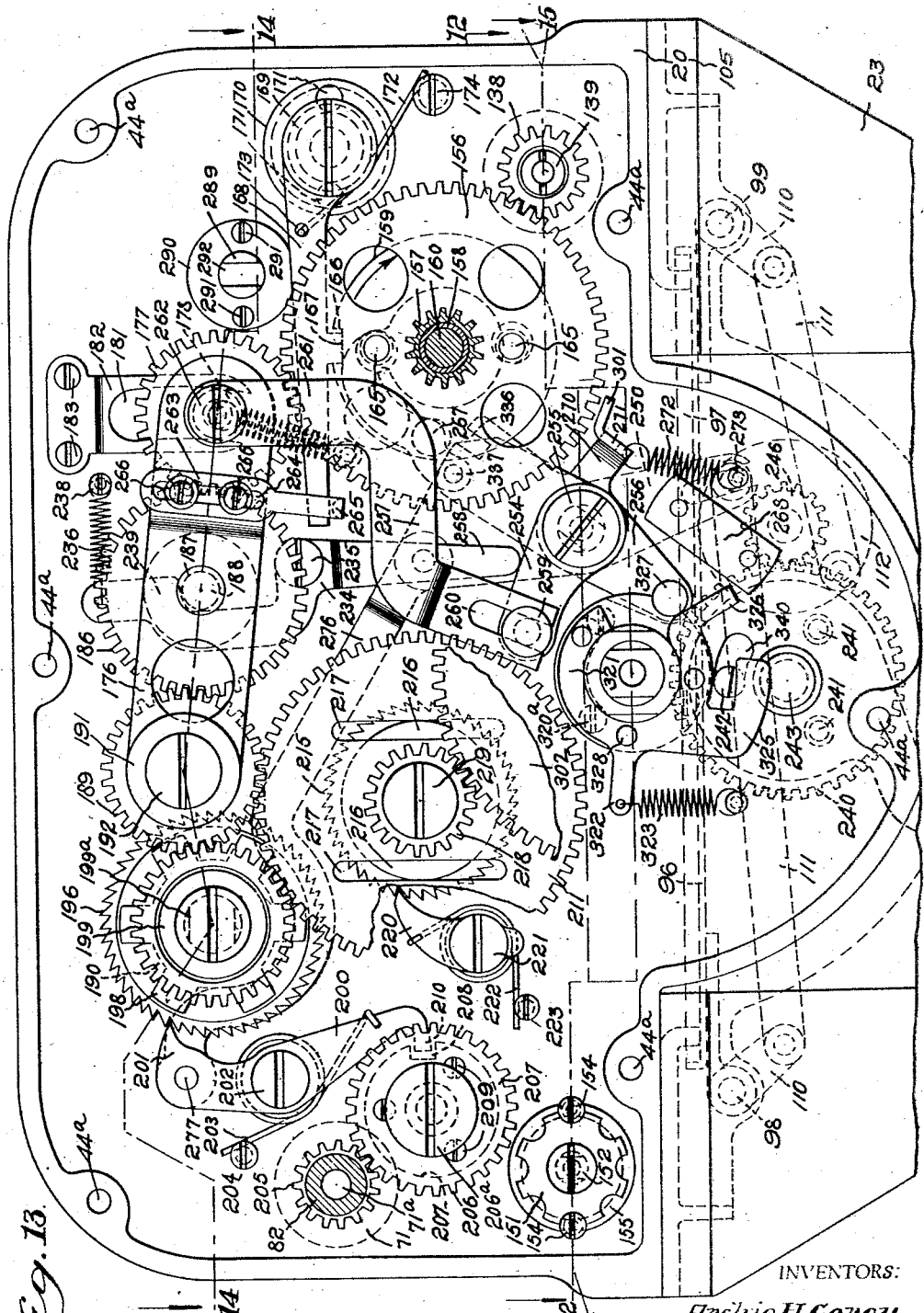
Fig. 13 is a right hand side elevation of the camera, with the mechanism cover removed, showing the mechanism with the shutter in rewound condition ready for making an exposure.

The shaft 71a of the right hand end of the said measuring roller 71 has attached thereto a hub 82, shown in Fig. 13. Said shaft 71a is supported by means of a suitable bushing (not shown) in a boss 83. The said measuring roller 71 will be further and more fully referred to when describing the film moving or feeding mechanism.

As most clearly shown in Fig. 5 and as also shown in section in Figs. 7 and 9, the film pressure pad is indicated generally at 84, and is employed to hold the film in contact with an aperture plate 85, best shown in Figs. 7 and 9. The structure of the said pressure pad 84 is such that it can readily be removed for cleaning the aperture plate 85, for repairs, or for any other purpose. The said pressure pad 84 is provided with two upwardly extending arms 86, 86 each having an L-shaped slot or opening 87 forming a hook for engaging a shoulder screw 88, of which two are provided, as shown in plan in Fig. 5. The shanks or stems of the two shoulder screws 88 receive the hook-like portions of the arms 86, 86 of the pressure pad 84. The said shoulder screws 88, 88 are received in vertically extending ribs or enlargements of the walls of the camera casing. The said pressure pad 84 is pressed downward into contact with the film 89 by means of spring 90, 90 attached to the film compartment cover 21 by rivets 91, 91. The two springs 90, 90 carried by the cover 21 are, when the cover is in position, directly over and press down upon the tops of the hook-like portions of the arms 86, 86, as is clearly evident from Figs. 7 and 9.

When the cover 21 is lifted from its position, the supply spool bracket 45 can be lifted vertically from its position by the operator. This act removes with the bracket the supply spool 52, and such supply spool can then immediately be readily separated from the said bracket 45. Thereupon, after removal of the take-up spool, the pressure pad 84 can be immediately lifted from its position shown in Fig. 7, and this leaves a clear unobstructed space down to the surface that receives the film when in picture-taking position. This permits cleaning of the exposed parts or ready access thereto for testing purposes.

It will be evident from the foregoing description that the pressure pad 84 is controlled wholly by the shutter release lever or trigger 40. That is to say, referring to Fig. 7, the pressure of the thumb or finger of the operator on said shutter release lever or trigger 40 acts, through the capping gate means, etc. (yet to be described) to allow the said pressure pad 84 to descend into contact with the positioned film under the influence of the two springs 90 fastened on the under side of the cover. Thus the pressure pad or plate 84 is held out of contact with the sensitized material at all times except when the camera is in condition for making an exposure, and can only be brought into contact with the sensitized material through the operation of the shutter release lever or trigger 40 when making an exposure. After the exposure is made and the shutter release lever or trigger 40 is restored to its normal position, the pressure pad or plate 84 is, by the action of the parts, removed from contact with the sensitized material, and because of the interlocking of the shutter release lever or trigger the said pressure pad or plate is actually locked in that condition or position. Furthermore the said pressure pad or plate 84 is held by spring pressure in its film-positioning position when in contact with the film so long as the shutter release lever 40 is held in a released condition, but will be removed from contact with the film as soon as the shutter release lever 40 is released and it (the pressure pad or plate 84) is returned to its normal position out of contact with the film.

Heretofore pressure pads have been controlled by the film winding mechanism, but we are the first so far as we are aware to control the pressure pad through an instrumentality such as the shutter release lever or trigger, whether in an aeroplane or other type of camera.

The said cover 21 is held in place by means of the said thumb screws 22, 22 engaging suitable tap holes 92, 92 in the camera body or housing 20, as indicated in Fig. 5. When said thumb screws 22, 22 are loosened sufficiently to be disengaged from the camera body or housing 20, the cover 21 can be removed, carrying with it the said springs 90, 90. The film supply and take-up spools 52, 62 can then both be removed and the pressure pad 84 can itself be readily removed by lifting it and moving it toward the left, viewing Fig. 7, thus disengaging the pressure pad hooks formed by the slots 87 in the two uprights 86 from the shoulder screws 88.

It is sometimes desirable to use a glass plate instead of an open aperture plate. The camera structure is such that the aperture plate 85 can be removed by first removing the pressure pad 84, as previously described, and substituting a glass plate 85a, as shown in Figs. 6 and 8.

In Fig. 6 the camera is shown as having the cover 21 removed and also the film supply and take-up spools 52 and 62, the supply spool bracket 45 and the pressure pad 84 all removed, the glass plate 85a having been substituted for the said aperture plate 85.

Again referring to Figs. 7 and 9, the cover 21 is provided with the usual light-lock, preferably consisting of downwardly extending members 93, 93 engaging openings or slots 94, 94 in the camera bottom 20 and receiving rubber strips 94a, and a folded-over edge 95, 95 engaging grooves 56 and 57 of the camera body side members, thus forming a complete light and dust trap for the film compartment. An unexposed film is loaded into the camera as indicated in Figs. 7 and 9, by placing the supply spool 62 in the supply spool bracket 45. The film indicated at 89 is then passed around the film idler 58 between the exposure aperture plate 85 and the pressure plate 84, around the film measuring roller 71 and onto the take-up spool 62, which has been previously placed in the camera. The mechanism for driving said take-up spool will be referred to presently.

The shutter used in the herein-disclosed camera is of the multiple aperture type subsequently described herein, at which point it will be made fully apparent that when the film is rewound for making a second exposure or when changing the aperture, it is necessary that all light passing through the lens be cut off from the sensitized film. The structure for accomplishing this result is best shown in Figs. 7, 9 and 10. Therein the capping gates, indicated at 96, 97 are shown as pivoted on shafts 98, 99 respectively, by hinged members 100, 101, and the said capping gates are caused to be closed by springs 102, 103. Said capping gates 96, 97 are desirably made up of pan-shaped members each having a turned-up edge at three sides and an overlapping formation where they meet, as most clearly indicated at 104 in Fig. 7. When the said gates 96, 97 are closed, all light is excluded from the sensitized film material.

Supported between the camera body or housing 20 and the lens cone member 23 is the capping gate support member or aperture plate 105, as clearly shown in Figs. 7, 9 and 10. The said plate 105 has a downwardly extending box-like formation on all four sides as indicated at 106.

This forms a light-lock between the lens cone member 23 and the aperture plate or support member 105, and formed on the upper side of such capping gate plate is a second box-like formation or flange extending upwardly on all four sides and engaging the inner walls of the camera body or housing 20, as indicated at 107. Such structure forms a light-lock between the camera body or housing 20 and the capping gate support member or plate 105.

On two sides of the box-like flange or formation 106 are formed bosses 108, 108 for supporting said shafts 98, 99. In the capping gate support member or plate 105 is formed an opening having a downwardly extending lip indicated at 109, and it is over such lip formation that the capping gates 96, 97 are closed to exclude light from the sensitized film material when the said capping gates are in the position shown in Fig. 7.

Fitted to said shafts 98, 99, and securely keyed thereto, are the hinged members 100, 101 previously referred to, and said capping gates 96, 97 are attached to the said hinge members by screws 96a, 96a and 97a, 97a, respectively, shown in Fig. 10. Said hinge members 100 and 101 are also provided with crank formations 110, 110, shown in dotted lines in Figs. 10 and 13. Fitted to the said crank members 110, 110 by means of shoulder rivets are link-like connecting members 111, 111 attached to capping gate actuating disk 112.

When the shutter is released by means of the shutter release lever or trigger 40 (Fig. 1), the said actuating disk 112 is caused to rotate in a manner subsequently described. The capping gates 96, 97 are caused to rotate on shafts 98, 99 respectively, through said hinge members 100, 101, causing said capping gates 96, 97 to be opened. The said capping gates are shown in a partially opened condition in Fig. 9 and in fully opened condition in Fig. 24. When pressure upon the shutter release lever or trigger 40 is relieved, the capping gates 96, 97 are caused to close by means of the springs 102, 103 respectively. Riding on the hinge members 100, 101, when the capping gates 96, 97 are in closed condition, are pressure pad lifting members 113, 113 provided with reduced diameters at either end and fitted into holes 114, 114 of the capping gate support member or plate 105, and fitted into holes 115, 115 in the camera body or housing 20 and also fitted into shallow holes or indentations 116, 116 of the pressure pad 84. The said holes 114, 115 and 116 are clearly shown in dotted lines in Figs. 7 and 9. In Fig. 7, the capping gates 96, 97 are shown in closed condition, the pressure pad 84 being consequently lifted.

The pressure pad 84 is raised vertically to provide clearance for the sensitized film 89 when such film is wound on the spool 62, by the influence of said pad lifting members 113, 113 that ride on the hinged members 100, 101. In the upward movement of the pressure pad 84, the springs 90, 90 are compressed. When the capping gates 96, 97 are opened as in Fig. 9, the pressure pad 84 is forced in a downward direction under the influence of pressure pad springs 90, 90, thus forcing said pad into contact with the sensitized film 89 and securely holding said film in place. The pressure of the thumb or fingers of the operator upon the shutter release lever or trigger 40 allows the said pressure pad 84 to be forced downward by the springs 90, 90, onto the area of the film whereon the exposure is next to be made.

When the camera is in its normal or rest condition, the said pressure pad 84 is always out of contact with the sensitized film material, thus preventing scratches or other markings on such film, but just prior to the exposure and as the capping gates are opened, the said pressure pad 84 is caused to contact with the film and so securely hold the film in position while the photograph is being made.

Referring to Figs. 9, 11 and 12, showing the construction and position of the shutter curtain rollers, the shutter curtain and the idler rollers, it will be noted that the shutter curtain rewind roller is represented at 117, the shutter rewind roller shaft at 118, and the shutter curtain at 119, as most clearly shown in Fig. 11, where it is represented as provided with slots or apertures 120, 121, 122. The curtain idler is shown at 123 in Fig. 7 and a second curtain idler on the opposite side of the exposure aperture is shown at 124. The curtain tension roller is shown at 125, the curtain tension roller shaft at 126 and the curtain tension roller spring at 127.

Referring to Fig. 12, the shutter compartment of the camera body or housing 20 is made up of four walls, namely, the right hand wall 128, the back wall 129, the left hand wall 130 and the front wall 131. The shutter curtain rewind roller 117 is provided at either end with bushings 132, 133 pinned to the shutter curtain rewind roller and shaft by means of pins 134, 135 respectively. The left hand end of the shutter curtain shaft 118, viewing Fig. 12, is fitted into a bearing 136 having a dust cap 136a and held to the camera wall 130 by screws 137, 137. Onto the right hand end of the shaft 118 is keyed a curtain roller rewind gear 138, securely held thereto by a locking screw 139. Into the wall 128 is fitted a bushing 140 providing a bearing for the hub of the curtain roller rewind gear 138, and thus providing a bearing for the curtain roller 117, which is spaced from the said wall 128 by means of a washer 141 and from the wall 130 by a washer 142.

The said second idler roller 124 is fitted to turn freely on pin 143 attached to the said wall 130 in any suitable manner. The opposite end of said second curtain idler 124 is supported on a pivot screw 145 threaded into the wall 128. The curtain tension roller 125 is provided with a bushing 146 on its left hand end, securely held thereto, so as to turn therewith, but it has a central hole or bearing through which the shaft 126 is free to rotate. The opposite end of the tension roller 125 is provided with a bushing 147 securely held to the tension roller 125 and having a central hole or bearing so as to turn freely on the shaft 126. The left hand end of said shaft 126 is supported in a bearing member 148 having a dust cap 148a held to the camera wall 130 by screws 149, 149. The opposite end of the tension roller shaft 126 is supported in a bearing 150 fitted into the wall 128. The right hand end of said shaft 126 is provided with flats, shown in dotted lines in Fig. 13, to which is fitted a notch plate 151 held to the said shaft 126 by screws 152. The spring 127 is anchored to the said shaft 126 on its right hand end, viewing Fig. 12, by passing through a hole 153 in said shaft 126, and the opposite end of said spring 127 is anchored in a slot in bushing 146, as clearly shown in Fig. 12.

In order to increase the tension of spring 127, the screws 154, 154 are removed and the notches 155 of plate 151 are engaged by a suitable tool and turned in a contraclockwise direction, viewing Fig. 13, then said screws are replaced, properly aligning notches 155, so that the screw heads will engage said notches. This supplies very simple means for applying predetermined tension upon the curtain tension roller, since the tool for adjusting the tension can be made with a clutch that will slip when a given or predetermined tension has been reached.

There will next be described the mechanism that controls the rewinding of the shutter curtain and moves a new area of the sensitized film material before the exposure opening, and also controls the releasing of the shutter for making an exposure, and for this purpose we will refer to Figs. 13 to 26 particularly.

Referring first and more particularly to Figs. 13, 14 and 15, the shutter used in the herein-disclosed camera is of the so-called multiple-aperture type, by which is meant a curtain having a separate aperture for each exposure speed. When using such curtain, it is desirable to select some one of the several apertures, and after that aperture is selected, the same aperture will be used for all subsequent exposures until a different aperture is selected.

Referring to Figs. 13, 14, 16, 17, 19 and 20, the curtain roller rewind gear 138 meshes with shutter rewind gear 156 which is provided with a cylindrical hub 157 constituting also a pinion, and is fitted over a second cylindrical hub or sleeve 158 that extends from and has integral therewith a shutter release disk or member 159. Said hub or sleeve 158 is free to turn on the stud 160 that is provided with a cylindrical hub 161 and a spacing washer 162, both held to the inner wall 128 of the mechanism-housing by means of screws 163, 163. Said shutter release disk 159 is provided with two index holes 164, 164 (Fig. 20), and the shutter rewind gear 156 is provided with two pins 165, 165 for engaging the index holes 164, 164. In Fig. 16 the said pins 165, 165 are shown as engaged with the index holes 164, 164 and in Fig. 17 the said index pins are shown disengaged from the said index holes. The purpose of this structure is to provide means for disconnecting the shutter rewind gear 156 from the shutter release disk 159, when selecting a new curtain aperture. Said shutter release disk 159 is provided with a notch 166, shown in Fig. 20 in full lines and in Fig. 13 in dotted lines. Said notch 166 serves as means to hold the shutter curtain in a set condition when the curtain is fully wound, and it is engaged by a detent 167 of a shutter release lever 168 which is pivoted on a shoulder screw 169 threaded into a hub or support member 170 held to the mechanism-housing wall 128 by screws 171, 171. The shutter release lever 168 is caused to be turned in a countraclockwise direction by means of a spring 172, one end of which engages a hole 173 of the lever 168, the opposite end thereof engaging a circular groove in a spring retaining screw 174. Inasmuch as the curtain maintains a tension on the curtain roller 117, tending to cause it to turn in a contraclockwise direction, the shutter rewind gear 156 would be caused to turn in a clockwise direction, but is prevented from doing so inasmuch as the shutter release disk 159 is held from turning by the detent 167 of the lever 168 engaging the notch 166 of said shutter release disk 159.

In Fig. 13, the shutter is shown in a fully wound condition ready for making an exposure, the rewinding cycle having been just completed. In order to rewind the shutter and move a new area of sensitized film material to the exposure opening, a train of gears and a film feed clutch are provided. We will now trace such gear train from the shutter rewind gear 156 to the main operating gear and in so doing will refer to the same figures and also to Figs. 21, 22 and 36.

Pivoted on a stud 175 is a rocker arm or bar 176, shown in Fig. 14. On the right hand end of such rocker arm or bar 176 is carried an idler pinion or gear 177 held to and carried by said rocker arm 176 by a shoulder stud 178 riveted to the said rocker bar 176. The opposite end of the shoulder stud 178 is provided with an enlarged diameter 179 for retaining the gear 177, and a reduced diameter 180 which engages a slot 181 of the guide plate 182 (Fig. 13). The said guide plate 182 is held in the mechanism-housing by screws 183, 183. There is a further reduced diameter 184 on the shoulder stud 178, provided with a groove for attaching a spring 185.

Also carried on the said rocker arm 176, as shown in Fig. 14, etc., is an idler gear 186, by means of a shoulder stud 187 which has a suitable shoulder or flange for retaining said idler gear 186, and a reduced diameter extension 188, the purpose of the latter being to form an interlock that will be described particularly in that part of the specification addressed to the interlocks, in detail.

As shown in Figs. 13, 14, 21, 24, 28, 34, 36, mounted on the stud 175 is an idler gear 189 which meshes with a film feed gear 190. The said idler gear 189 and the rocker arm 176 are held to the stud 175 by means of a retaining washer 191 and a retaining screw 192. The stud 175 is provided with an enlarged diameter base 193, shown in Fig. 36, and is held to the mechanism-housing by means of screws 194, 194. The film feed gear 190 (Fig. 14) is free to rotate on a hub 195 of the ratchet wheel 196 fitted to the take-up spool shaft 76 (Fig. 36) and keyed thereto by means of flats 197 (Fig. 14). Keyed to said film feed gear 190, as shown in Figs. 13 and 14, is a spring clutch member 198 in frictional contact with ratchet wheel 196. The said film feed gear 190 and ratchet wheel 196 are held in position on the shaft 76 by means of a washer 199 and a locking screw 199a.

The ratchet wheel 196 is held from rotating in a contraclockwise direction when a predetermined amount of film has been fed as governed by the film measuring roll 71, by a rocker arm 200, shown in Fig. 13, etc. as having a pawl or dog 201 for engaging teeth in said ratchet wheel 196. Said rocker arm 200 is supported on a shoulder screw 202 threaded into a boss on the mechanism wall 128, and it is caused to turn in a clockwise direction under the influence of a spring 203, which has a hooked formation engaging the lower end of rocker arm 200, the other end being anchored on a screw 204 having a suitable groove to hold said spring in position.

Figure 36:
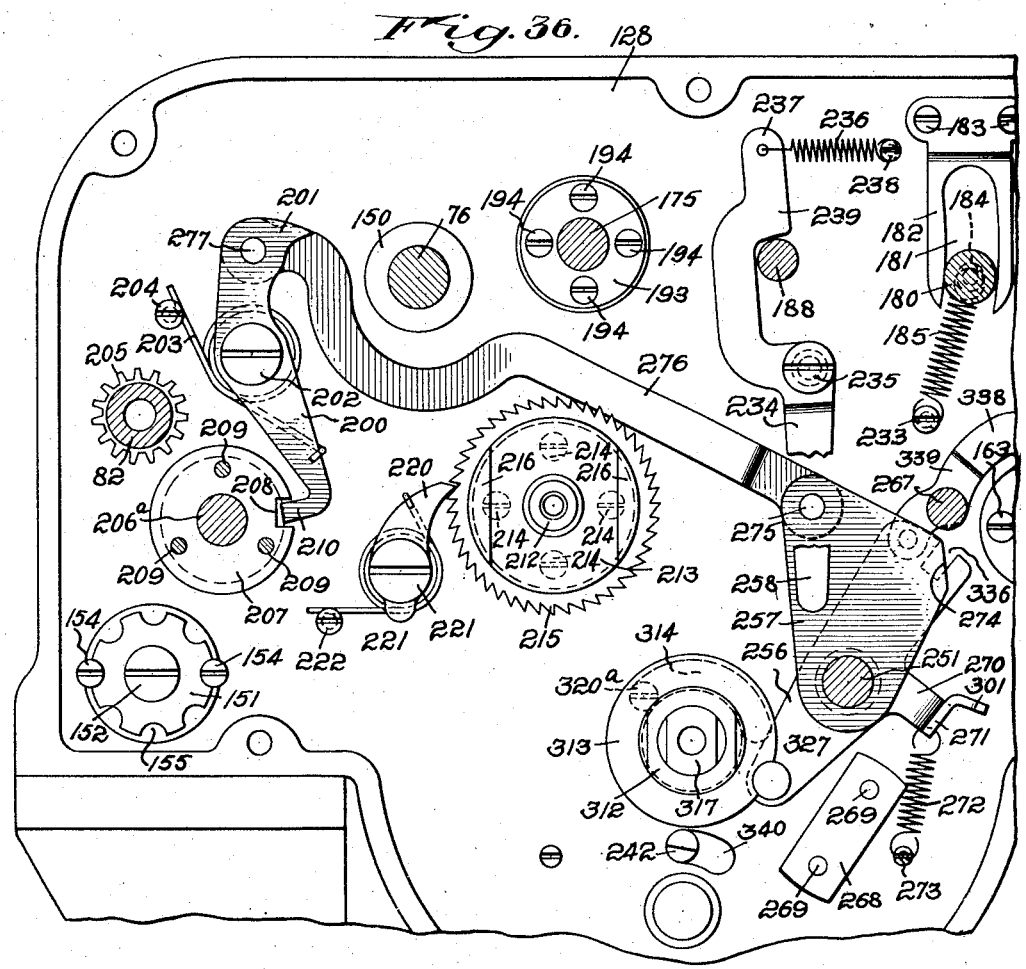
Fig. 36 is a view similar to Fig. 34, some of the parts having been removed to show more clearly the film measuring mechanism and the rewind interlock.

As shown in Figs. 13 and 36, the film measuring roller 71 is provided with a gear 205 which meshes with an index gear 206 attached to the mechanism-housing by a screw 206a, and an index plate 207 having a notch 208 is attached to said index gear 206 by screws 209. The lower end of the rocker arm 200 is provided with a reverse L-shaped formation indicated at 210 for engaging the notch 208 of the index plate 207 each time the notch 208 reaches the formation 210 as the index plate 207 is revolved by the gear 206.

When the pawl or dog 201 engages the teeth of the ratchet wheel 196, the film take-up spool is prevented from turning, but the film feed gear 190 can continue to revolve because of the friction clutch previously described. When the pawl or dog 201 is withdrawn from the teeth of the ratchet wheel 196, the take-up spool is driven by said film feed gear 190 through the clutch member 198, until the bent-over end 210 drops into the notch 208 of the index plate 207.

The gear ratio between gears 205 and 206 is such that when sufficient film is measured off by the film measuring roller 71 to bring a new supply of film before the exposure opening, the index plate 207 will have made one complete revolution. The dog or pawl 201 is withdrawn from the ratchet teeth of the ratchet wheel 196 by the action of the shutter running down, as will be later fully explained.

As best shown in Figs. 13 and 36, also meshing with the film feed gear 190 is a main driving gear 211 that is carried on stud 212 provided with an enlarged diameter boss or flange 213 and attached to the inner wall of the mechanism-housing by means of screws 214, 214. Also riding on the stud 212 is a ratchet wheel 215 which is driven by the main driving gear 211 by means of keys 216, 216 engaging keyways 217, 217 of the main driving gear 211. Attached to the latter and operating therewith is a pinion 218 shown in Fig. 13.

The ratchet wheel 215, the main driving gear 211 and the pinion 218 are held onto the stud 212 by means of a large head screw 219, and the said main driving gear 211 is prevented from turning in a contraclockwise direction by means of a pawl 220 engaging teeth in the ratchet wheel 215, the said pawl 220 being mounted on a stud itself mounted on the back wall of the mechanism housing, and being held in place by a large head screw 221. The pawl 220 is caused to be rotated in a clockwise direction by means of a spring 222, one end of which has a hooked formation engaging the upper end of the said pawl 220. The opposite end of the spring 222 is held in place by a screw 223 having a suitable groove therefor.

It has previously been explained how film is wound on the take-up spool 62 by rotation of the film feed gear 190 through the clutch member 198, ratchet wheel 196 and the shaft 76. It has also been explained that for each exposure the index gear 206 makes on complete revolution and then stops, thereby preventing further winding of the film until a second exposure is made.

In order to count the number of exposures and as best shown in Figs. 14 and 18, a second gear 224 is carried by hub 82 which meshes with an index gear 225 having teeth, one greater in number than has index gear 206. Therefore, for each revolution of the index gear 206 the gear will make one revolution less the space occupied by one tooth, and inasmuch as the graduations on the counter dial 41 are equal to the spacing of the teeth on gear 225, each time an exposure is made, the index gear 206 will make one complete revolution and the gear 225 will make one complete revolution less one tooth. The dial 41 will make one complete revolution less one graduation. This provides means for accurately counting the exposures. The said dial 41 is provided with a knob 226 and a shaft 227 which passes through a hole 228 in the mechanism-housing cover 43. The said shaft 227 is also provided with a reduced diameter 229 to which is fitted a washer 230 and also the said gear 225, which are held in frictional contact by means of a spring 231 held to the shaft 229 by a "coining" operation or in any other suitable manner. This construction permits the setting of he dial 41 to zero indicator 232 when reloading the camera with a new supply of film.

Again referring to Figs. 13 and 14 and also to Fig. 21, wherein the structure is shown in a fully wound condition, film has been wound on the take-up spool 62 and is prevented from being further wound by pawl 201 engaging ratchet wheel 196, this all being accomplished by the rotation of the main driving gear 211 turning through one revolution, thereby driving the shutter rewind gear 156 in the manner previously described. The main driving gear 211 may have a crank attached in place of the pinion 218 and in order to simplify the description of the operation, it will be assumed that means is provided to drive the main driving gear 211 through a cycle of one revolution for each exposure, and we will now describe the reciprocating and driving means for the reciprocating rewinding and the interlocking means provided therefor, after having fully explained the shutter operation and the film winding operation in its simpler form.

Figure 34:
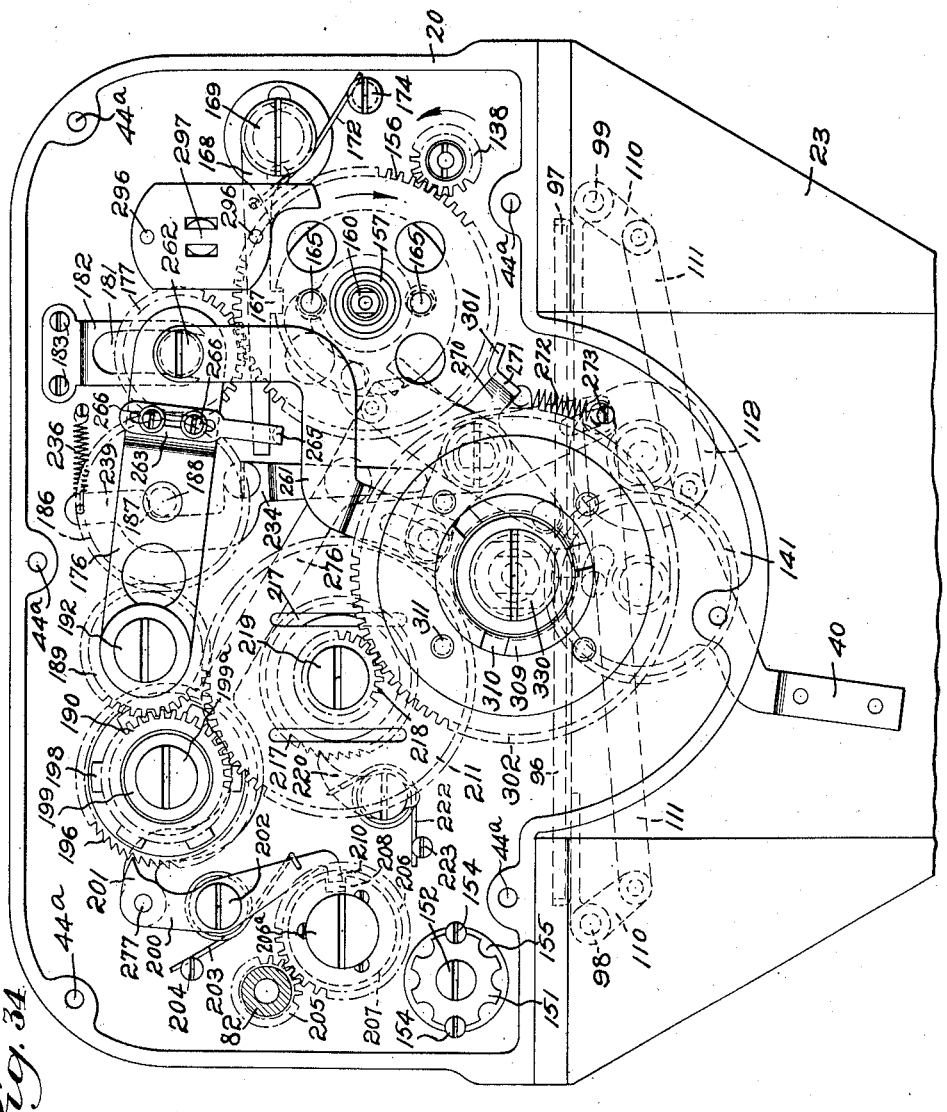
Fig. 34 is a view similar to Fig. 28, showing the shutter as having been rewound, and the film as having been advanced to a new exposure area and ready for the second exposure.

As shown in Figs. 13, 21 and 34, the shutter rewind gear 156 is prevented from turning by the pawl or detent 167 of the shutter release lever 168, and because the gear 177 is still in mesh with gear 156, and inasmuch as the gear train can move only in one direction, due to ratchet wheel 215 and pawl 220, the gear 177 being held in mesh with the said shutter rewind gear 156 by means of spring 185 attached to the stud 184 and a screw 233 threaded into the mechanism housing. To lock securely the gear 177 in mesh with the shutter rewind gear 156, here is provided a rocker arm lock lever 234 pivoted on a shoulder screw 235 and caused to turn in a clockwise direction by means of a spring 236 hooked to the lever 234. By a hole 237 the opposite end of said spring 236 is connected to a stud 238 threaded into the mechanism-housing. The upper portion of the rocker arm member 234 is of a modified C formation having a hook 239 which engages the stud 188 of the rocker arm 176, thus holding the gear 177 securely in mesh with the shutter rewind gear 156.

As best shown in Figs. 31, 32 and 33, when the shutter release lever or trigger 40, positioned as shown in Fig. 21, is caused to turn in a clockwise direction, the gear 240 will also be caused to turn in a clockwise direction. The said shutter release lever or trigger 40 and the gear 240 are shown held together by means of rivets 241, 241 and by a special pin 242, having its end cut away as shown in Fig. 32, which is part of the interlock to be presently described.

The gear 240 and the shutter release lever or trigger 40 are mounted on the inner wall of the mechanism-housing by means of a shoulder rivet 243, and to one wall of the lens cone member 23 is fitted a bushing 244 into which a shaft 245 is free to rotate, as shown in Fig. 33. To one end of the shaft 245 and integral therewith, is the capping gate-operating or actuating disk 112, previously referred to, and onto the opposite end is keyed a gear 246. Since the gears 240 and 246 are constantly in mesh, when the shutter release lever or trigger 40 is moved in a clockwise direction, the gear 246 will be turned in a contraclockwise direction, thus operating the actuating disk 112 and opening the capping gates 96, 97 through connecting arms 111 and 111a and shoulder rivets 247, 248.

The opposite movement of the shutter release lever or trigger 40 (that is, in a contraclockwise direction) results in closing said capping gages through movement of the actuating disk 112, and such closing movement of the capping gates is timed in operation with, and is operatively connected in action to, the film feeding means and the shutter rewinding means. Through the described interlocks for the shutter operating handle 39 and the shutter release lever or trigger 40, the capping gates are actually locked closed when closed.

The shoulder rivet 248 is provided with a cylindrical extension 249 that engages the shutter operating arm or lever 250 which, as best shown in Fig. 15, is attached to a shaft 251 that rides in a bushing 252 fitted into a boss 253 on the mechanism-housing wall 128. Said shaft 251 is provided with suitable flats to which is keyed a crank member 254 held to said shaft 251 by means of a locking screw 255, shown also in Fig. 21, etc. Free to turn on said shaft 251 is a rewind interlock member 256, shown also in Figs. 21, 22, 23, 24, 26 and 27, and film ratchet release member 257. As the shutter release lever or trigger 40 is rotated in a clockwise direction, and the actuating disk 112 is rotated in a contraclockwise direction, this causes the opening of capping gates 96, 97, as previously referred to, and causes the shutter operating arm 250 and the shaft 251 and the crank member 254 to be rotated in a clockwise direction, as indicated in Fig. 21.

As the crank member 254 is rotated in a clockwise direction, an extending finger 258 of the lever 234, as shown in Figs. 21 and 24, is engaged by the crank member 254, and the lever 234 is caused to be turned in a contraclockwise direction on the shoulder screw 235, thus disengaging the hook 239 from the pin 188. The rocker arm 176 is now free to be moved upward to disengage the gear 177 from the shutter rewind gear 156, as indicated in Fig. 24. The crank member 254 is provided with a shoulder rivet 259 riding in a grove or slot 260 of link 261. The groove 260 provides a certain amount of lost motion in the travel or turning of the crank member 254, for the purpose of allowing the capping gates 96, 97 to be partially opened and at the same time to disconnect the hook 239 from the pin 188 before the shutter is released.

As the shutter release lever or trigger 40 continues to move, the capping gates 96 and 97 continue to open until they reach the position shown in Fig. 24, and the link 261 which is connected to rocker arm 176 by means of a shoulder screw 262 will cause the rocker arm 176 to be rotated about the screw 175 until the gear 177 is fully disengaged from the shutter rewind gear 156, as shown in Fig. 24. Attached to the rocker arm 176 is a hook-shaped member 263 having a slot 264 and a hook 265, and it is held to the rocker arm 176 by screws 266, 266. The purpose of the hook-shaped member 263 is to engage the end of the shutter release lever 168 by means of the hook 265, thus disengaging the detent 167 from the notch 166 of the disk 159. The mechanism will now be in the position shown in Fig. 24, wherein the shutter curtain has run all the way down and the exposure is completed.

As best shown in Figs. 19 and 21, the disk 159 is provided with a pin 267, the purpose whereof is to operate the film measuring device and to limit the motion or travel of the plate or disk 159 and the shutter rewind gear 156 when the shutter curtain reaches the end of its travel. The said pin 267 is also used for operating one of the interlocks, as will be described presently.

Still referring to Fig. 24 and also to Fig. 26, as the curtain roller is turned in a contraclockwise direction under the influence of the curtain tension roller 125, the shutter rewind gear 156, disk 159 and pin 267 turn in a clockwise direction until said pin 267 engages the interlock member or lever 256 and the ratchet release member 257, which are caused to turn on the shaft 251 until said member or lever 256 is stopped by a stopping block 268. The said member or lever 256 is provided with a laterally extending arm 270 having an upturned end 271, to which is attached a spring 272, the other end whereof is hooked to a pin 273 threaded into the mechanism-housing wall 128. The ratchet release member 257 is pivoted on the shaft 251 as previously explained and is of a generally rectangular shape, as best shown in Fig. 36. The upper right hand corner 274 thereof is cut off to form a cam face to be operated upon by said pin 267 and has riveted thereto by means of a shoulder rivet 275 a rocker arm operating link 276, the opposite end whereof is connected to rocker arm 200 by means of shoulder rivets 277, as shown in Fig. 36.

In Fig. 24 the mechanism is shown in the condition when the shutter curtain has run all the way down. Therein the pin 267 has contacted with the cam face 274 of the ratchet release member 257 and has caused said ratchet release member 257 to be rotated in a contraclockwise direction, carrying with it the rocker arm connecting link 276, thus causing the rocker arm 200 to be turned in a contraclockwise direction against spring 203, thereby disengaging pawl 201 from the teeth of ratchet wheel 196. When the shutter release lever or trigger 40 is released, the capping gates 96 and 97 are caused to be closed in a manner previously described and this action will cause the actuating disk 112 to be rotated in a clockwise direction, allowing the shutter operating arm or lever 250 to be turned in a contraclockwise direction, also turning the crank member 254 in a contraclockwise direction, thus allowing rocker arm 176 to turn in a clockwise direction and permitting gear 177 and shutter rewind gear 156 again to become engaged under the influence of spring 185. The shutter can now be rewound, and since the capping gates 96 and 97 are closed, the sensitized material will not be exposed when the shutter aperture is wound past the exposure opening. Thus the closing movement of the capping gates is timed in operation with and is operatively connected in action to the film feeding means and the shutter rewind means. Rewinding of the shutter is now started and a sufficient length of unexposed film is fed before the exposure aperture by turning the main driving gear 211 in a clockwise direction until a notch 166 of the disk 159 is engaged by the detent 167.

Referring to Fig. 28, the shutter rewind gear 156 has started to turn and has turned approximately one half a revolution. The film feed gear 190 has also been turned, causing the film spool 62 to be rotated through the clutch member as previously described, and the ratchet wheel 196 is caused to turn in a contraclockwise direction. As the film 89 passes over the film measuring roller 71, the gear 205 is caused to turn in a clockwise direction, turning the index gear 206 and the index plate 207 in a contraclockwise direction until a sufficient amount of film has passed over the film measuring roller 71 to provide an unexposed area of sensitized material before the exposure opening. The notch 208 of said index plate 207 will then have reached the bent-over end 210 of the rocker arm 200 which will now be caused to turn in a clockwise direction by spring 203, until the pawl 201 engages the teeth of the ratchet wheel 196, thus stopping the spool 62 from further turning. However, the main driving gear 211 is continued in motion until the notch 166 of the disk 159 is engaged by the detent 167 of the lever 168. The mechanism then will be in the condition shown in Figs. 13 and 34.

It will be noted that as shutter rewind gear 156 was caused to be turned in a contraclockwise direction to rewind the shutter curtain, as illustrated in Fig. 28, the pin 267 was carried away from the cam face 274 of the ratchet release member 257, thus permitting the said ratchet release member 257 to be moved in a clockwise direction, and permitting the rocker arm 200 to turn in a clockwise direction until the bent-over end 210 engages the outer surface of the index member 207.

In order to select a different aperture or a different shutter speed, we proceed as follows:

Referring to Figs. 16 and 17, the shutter rewind gear 156 has attached thereto, as stated, the pinion 157 having integral therewith a sleeve 157a, and to the right hand end of said sleeve 157a, viewing Fig. 16, is attached a threaded bushing 278 which has a press or shrink fit onto sleeve 157a. Threaded to the bushing 278 is the shutter setting knob 37 locked in place by the lock nut 279. The shutter setting knob 37 is of a hollow cylindrical construction providing a space for the knob return coil spring 280, one end of which rests on the inner bottom wall of the said knob 37 and the other end thereof rests against a spring retaining washer 281 held in place by a cover plate 282, which is fitted to the shaft 160 provided on its right hand end with two flats for keying the cover plate 282, which with the washer 281 are held to the shaft 160 by a screw 283. The spring 280 tends to keep the shutter rewind gear 156 in contact with the disk 159, thus engaging the pins 165, 165, with the holes 164, 164 of said disk 159.

When the shutter setting knob 37 is moved to the right, as in Fig. 17, the shutter rewind gear 156 and pinion 157 are also moved to the right, disengaging pins 165, 165 of said shutter rewind gear 156 from holes 164, 164 of disk 159, and the gear teeth of said shutter rewind gear 156 are disengaged from the teeth of the rewinding gear 177. The said shutter rewind gear 156 can now be turned to select a different shutter aperture, but said disk 159 is held stationary because the notch 166 of disk 159 is engaged by the detent 167 of the shutter release lever 168. An inspection of Fig. 39 will make it evident that, as hereinbefore stated, pressure by the thumb or finger of the operator upon the shutter release lever or trigger 40 will allow the pressure pad 84 to descend under the influence of the springs 90, 90 onto the area of the film upon which the next exposure is to be made. Said springs, as heretofore stated, are on the under side of the film chamber cover 21.

Referring particularly to Fig. 40, and also to Fig. 11, in order to provide means for indicating the position of the shutter curtain with respect to its several apertures, an index gear 284 is mounted on the mechanism plate 43 by a large head screw 285 and is free to turn thereon. The said index gear 284 is in mesh with the pinion 157. When the shutter is fully wound ready for exposure, the shutter setting or speed can be read in the window 42 of the index plate 286 mounted on the cover 43 by means of screws 287, 287.

In Fig. 40, the camera is set for a speed of $1/600$ which corresponds to curtain aperture 120 of the curtain 119, shown in Fig. 11. If a shutter speed of $1/300$ is desired, the shutter setting knob 37 is moved to the right viewing Fig. 17, and turned in a clockwise direction until the numeral 300 appears in the window 42 of the index plate 286. If a shutter speed of $1/150$ is desired, the shutter setting knob 37 is moved to the right and turned in a clockwise direction until the number 150 appears in said window, and if an indicated speed is $1/150$ and a shutter speed of $1/600$ is desired, the shutter setting knob 37 is turned to the right viewing Fig. 17, in a contraclockwise direction until the numeral 600 appears in said window 42, as indicated in Fig. 40.

Means are provided to prevent over movement of the shutter curtain by the shutter curtain knob 37. Otherwise accidents would occur, as, for example, if the shutter were set for $1/600$ and it was desired to change the shutter speed and said shutter setting knob 37 were turned in a contraclockwise direction. In such event, the curtain 119 would be torn loose from the curtain roller 117, and if, when a speed of $1/150$ was indicated and the shutter setting knob 37 was turned in a clockwise direction, the curtain 119 would be caused to be wound up on the curtain roller 117 in the opposite (that is, in the wrong) direction. Therefore, in order to limit the motion of the shutter setting knob 37 when changing shutter speed and so as not to interfere with the turning of shutter rewind gear 156 when the shutter is being operated, there is provided interlocking means for engaging pin 288 of the index gear 284, and this mechanism will now be described.

Referring to Fig. 13, there is attached to mechanism-housing wall 128 a stud 289 having an enlarged base 290 held to the inner wall of the mechanism-housing by means of screws 291, 291. The stud 289 is provided with a central slot 292, and over said stud, as shown in Figs 16 and 17, is fitted a housing 293 having an enlarged diameter 294. Attached thereto is a detent plate 295 by means of rivets 296, 296, as best shown in Figs. 21 and 34. Said detent plate 295 is provided with a central key member 297 fitting into the slot 292 of the stud 289 to prevent the detent plate 295 from turning on said stud 289. Said detent plate 295 can be moved to the right or to the left, viewing Figs. 16 and 17. It is caused to be moved to the left, viewing Fig. 16 by means of spring 298 held to the cover 43 by means of rivets 299, 299.

When the shutter is in a normal position (that is, when it is ready for making an exposure) the detent plate 295 with detent finger 300, is held out of engagement with the pin 288. When the shutter speed control or setting knob 37 is moved to the right carrying with it the shutter rewind gear 156, the enlarged diameter 294 of the bushing 293 and the detent plate 295 with the detent finger 300, are caused to be moved to the right against the spring 298. This action disengages the shutter rewind gear 156 from the winding gear or pinion 177 and places the detent finger 300 in position to be engaged by the pin 288, if said shutter speed control or setting knob 37 is turned too far in either direction. This definitely prevents the making of an improper adjustment for shutter speed.

It will be apparent that the only time that a correct indication of shutter speeds can be obtained is when the shutter is rewound and ready to make an exposure. In order to prevent anyone from trying to change shutter speeds when the curtain is run down, there is provided an interlock operated by rewind interlock member 256 previously referred to, and which rewind interlock member 256 is, as has been stated, caused to turn in a clockwise direction by spring 212 and in a contraclockwise direction by pin 267 of the shutter release disk 159, when the shutter curtain is run all the way down.

Referring particularly to Figs. 13, 24, 25, 26, 36, said rewind interlock member 256 has, as already described, a laterally extending arm 270 and a vertical projection 271, and it also has a bent-over member 301. When said rewind interlock member 256 is caused to be moved in a contraclockwise direction under the influence of pin 267, the member 301 overlies shutter rewind gear 156, clearly shown in Figs. 24 and 25, thereby preventing the shutter setting knob 37 from being moved to the right to change the shutter curtain relationship with respect to the shutter release disk 159.

We will next describe the rewinding device, which has a to and fro motion, preferably oscillatory, but which may be reciprocatory, and for that purpose will refer to Figs. 15, 29, 30, 34, 37, 41. Meshing with the pinion 218 is a gear 302 constituting the free running member of an overrunning clutch, best shown in Figs. 15 and 41. Said clutch is made up of the outer ring gear 302, previously referred to, and a driving member 303 having notches 304, 304, to receive rollers 305 that are thrust forward, or in a clockwise direction (viewing Fig. 41) by springs 306, 306. On either side of the driving member 303 are guide plates 307, 308, shown in section in Fig. 15. The guide plate 308 is provided with a drive member 309 having notches 310, 310 (Fig. 41). The driving member 303 and the guide plates 307, 308 are held together by means of rivets 311, 311.

Figure 37:
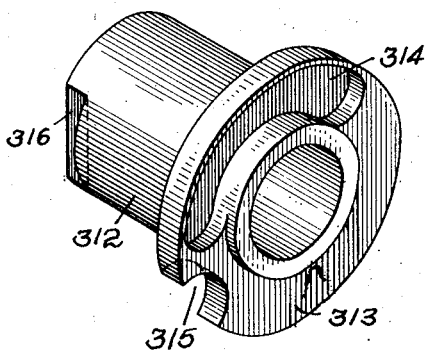
Fig. 37 is an enlarged detail in perspective of one of the rewind members.
Figure 38:
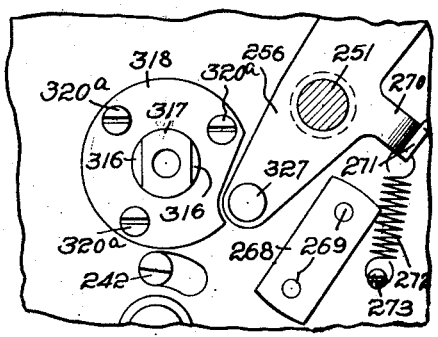
Fig. 38 is a fragmentary detail of parts shown in Fig. 36, the shutter speed control knob being removed, so as to show more clearly one of the interlock members.

The assembly made up of driving member 303 and guide plates 307 and 308, which carries outer ring gear 302, is fitted to a bushing 312, shown in Fig. 37 as of a cylindrical structure having an enlarged flange 313, provided with a groove 314 semi-circular in shape and with a notch 315. The purpose of groove 314 is to provide a limit of motion for the bushing 312 in a rotary direction, co-acting with head screw 320a, shown in Fig. 29, and the notch is for the purpose of preventing the bushing 312 from rotating at certain times. The opposite end of the bushing 312 is provided with flats 316, 316 that are fitted into a suitable hole in the guide plate 308. The driving member 303 and the guide plate 307 are provided with suitable holes to fit over the body of the bushing 312, which rides on a pivot member 317 (Fig. 36, etc.) having an enlarged diameter flange 318 and an extending dowel 319 (Fig. 15). The pivot member 317 is fitted to the mechanism wall 128 and is held thereto by means of screws 320, 320 and 320a, best shown in Fig. 38. Also fitted to the bushing 312, as shown in Fig. 29, and free to rotate thereon, is a trigger interlock member 321 having a laterally extending arm 322 to which is attached a spring 323, the opposite end whereof is attached to a pin 324 threaded into the mechanism-housing wall 128. Said trigger interlock member 321 is provided with a hook-shaped formation 325 for engaging the pin 242 and a laterally extending arm 326 for engaging a pin 327 of the rewind interlock member 256. The trigger interlock member 321 is kept in proper spaced relation between flange 313 and guide plate 207 by spacing pins 328, 328, shown in Fig. 30.

Referring particularly to Figs. 15, 40 and 41, the bushing 312 and the clutch assembly are held to the pivot member 317 by means of a washer 329 and a large head screw 330 threaded in the pivot member 317. For driving the gear 302 there is provided the shutter handle or operating member 39, shown in many figures of the drawings, which is made up of a dog plate 331 (Fig. 15) having interengaging tangs to fit slots 310 of the drive member 309, as shown in Fig. 41, and a spacer 332 that is fitted between the dog plate 331 of the shutter handle or operating member 39, and is held into the assembly by means of rivets 333, 333. The shutter handle or operating member driving assembly made up of the said parts is held to and is supported on the camera cover 43 by semicircular disk-like plates 334, 334, which are attached to the cover 34 by means of screws 335, 335.

It will be noted that when the shutter handle or operating member 39 is oscillated, the clutch drive member 303 and the bushing 312 will also oscillate on the pivot member 317, but the outer ring gear 302 will be driven only in a contraclockwise direction by clutch members 305 in a manner well known in the art. Said outer ring gear 302, which is in mesh with pinion 218 (Fig. 13) cannot be turned in a clockwise direction because of ratchet wheel 215 and pawl 220, previously referred to. Said clutch driving member 303 and the said bushing 312 are limited in motion to approximately 120° by means of a stop pin which is formed by the enlarged head-on screw 320a (Fig. 38) riding in the groove 314 of the flange 313. Therefore the shutter handle or operating member 39 can be oscillated through an arc of 120° only, and when said handle or member 39 is operated in a contraclockwise direction, the main driving gear 211 will be caused to turn a distance sufficient to turn the shutter rewind gear 156 that part of a revolution necessary completely to rewind the shutter curtain; and when the shutter curtain is fully rewound, it is stopped from further motion by detent 167 engaging the notch 166 of the shutter release disk 159 (Fig. 13, etc.). However, a series of movements to and fro of less than 120° can also be used for rewinding the shutter curtain. When the later is fully wound said shutter handle or operating member 39 can no longer be operated in a contraclockwise direction, thus said handle or member must be returned to the starting position, as shown in Fig. 40, before the shutter curtain can be released.

When said shutter handle or operating member 39 is returned to its starting position by turning it in a clockwise direction, the pin 327 of the rewind interlock member 256 will engage the notch 315 of the flange 313 and thus prevent further rewinding until the pin 327 has been withdrawn, as indicated in Figs. 13, 21, 35, 36. As the shutter is released and the curtain is allowed to run down, the shutter rewind gear 156 turns in a clockwise direction, carrying with it pin 267 until it is stopped against the upper end of the rewind interlock member 256, as shown in Figs. 24, 26. This will cause said rewind interlock member 256 to be rotated in a contraclockwise direction on shaft 251 and against the tension of the spring 272. The parts of the interlock will now be in the position shown in Figs. 24, 26, 28 and 29. In the upper end of the rewind interlock member 256 is a notch 336 (Figs. 24 and 26) which is engaged by a pin 337 of the spring member 338 when the interlock has been moved to the position shown in Fig. 26. The pin 327 will be held out of engagement with the notch 315 and the shutter handle or operating member 39 can now be operated.

The said pin 327 will be held out of engagement with the notch 315 until the shutter is again rewound. As the shutter is rewound the shutter rewind gear 156 will be turned in a contraclockwise direction until the shutter is fully rewound and the notch 166 is engaged by the detent 167. The pin 267 will now be in the position shown in Fig. 35, overlying the bent-up end 339 of the spring 338 carrying pin 337. This will cause said pin 337 to be disengaged from the notch 336 of the rewind interlock member 256 and allow the said rewind interlock member 256 to be turned in a clockwise direction by means of the spring 272, so as again to engage the notch 215 of the tang 313 when the shutter handle or operating member 39 has reached the limit of motion in a clockwise direction.

The spring 338 is fitted into a recess in the wall 128 of the mechanism-housing and is held to the said mechanism-housing by screws 163, 163, previously referred to as holding the stud 160 to the mechanism-housing wall.

It is very important to have the shutter release lever or trigger 40 locked after each exposure and until a new supply of film has been moved into position before the exposure opening. We have accomplished this in the following manner.

Referring to Fig. 13, where the mechanism is shown in condition for making an exposure (that is, the shutter being fully wound and the handle 39 being locked), and referring also to Figs. 24, 28 and 29, the gear 240 is provided, as previously stated, with a pin 242 passing through an elongated slot 340 in the mechanism housing wall. The trigger interlock member 321 has been rotated in a clockwise direction under the influence of pin 327 and finger 326, thus moving the hook 325 out of the path of the said pin 242. When the shutter release lever or trigger 40 is operated in a clockwise direction, moving the gear 240 and the pin 242, the said pin 242 will have passed over the end of the said hook 325, as indicated in Fig. 21. As the movement of said shutter release lever or trigger 40 is continued in a clockwise direction, the shutter is thereby permitted to operate. The mechanism will then be in the condition shown in Fig. 24, wherein the shutter has run all the way down. The pin 327 will be rotated in a contraclockwise direction and away from the finger 326, and as the shutter trigger 40 is released and allowed to turn in a contraclockwise direction, the trigger interlock member 321 will be caused to rotate in a contraclockwise direction allowing the hook 325 to be placed in the path of the pin 242, thus preventing a second operation of the shutter release lever or trigger 40 until the shutter has been rewound. The shutter trigger interlock mechanism is now in the position shown in Fig. 29 wherein the said shutter release lever or trigger 40 is locked and the shutter rewind mechanism is unlocked and the shutter has been partially rewound, as shown in Fig. 28. When fully rewound, the mechanism will be in the condition shown in Fig. 13, ready for a second exposure.

*Résumé of the movement of the two co-acting interlocks*

The following is a résumé of the operation of the shutter-operating or rewind-handle interlock and the shutter release lever interlock, the part 39 being the shutter operating handle and the part 40 being the shutter release lever or trigger.

Figure 35:
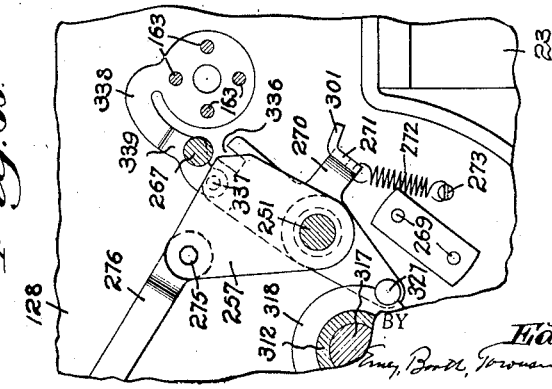
Fig. 35 is a fragmentary view similar to Fig. 34, but with some of the parts removed to show more clearly the construction of the rewind interlock when the mechanism is in the condition shown in Fig. 34.

In normal operation, said operating handle 39 is first moved in a contraclockwise direction viewing Fig. 3, through an arc of approximately 120° to the position shown in dotted lines, Fig. 3. This motion causes film to be fed for the next exposure and the shutter curtain to be rewound in the manner fully described hereinbefore. Said operating handle 39 is then returned to the position shown in full lines in Fig. 3, and it becomes locked in this position, as shown in Fig. 35, by reason of the pin 327 engaging the notch 315 of the flange 313 integral with the hub 312 connected to the handle 39, as already described. Said pin 327 is attached to the rewind interlock member or rocker arm 256 and is caused to engage the notch 315 by said rewind interlock member 256 being moved in a clockwise direction under the influence of spring 272. Said shutter operating handle 39 can now no longer be operated until after the shutter has been released, but said shutter release lever or trigger 40 can now be operated for releasing the shutter because the hook shaped member 325 (Figs. 21, 24, 28, 29, showing the different positions thereof) has been moved in a clockwise direction by the pin 327 acting on the extension 326 of the trigger locking member 321. Said hook shaped member 325 will now be held in this position until the shutter curtain has run all the way down. The shutter release lever or trigger 40 is now operated, the pin 242 on the gear 240 will move in a clockwise direction in the opening 340 (viewing said figures) and said gear 240 will be rotated in a clockwise direction, thus operating the capping gate levers 250 and 254. This will cause the gear 177 to be disengaged from the shutter rewind gear 156 (Fig. 24), and a further movement in a clockwise direction of said gate lever 254 by said shutter release lever or trigger 40 will cause the dog 167 to be disengaged from the notch 166 of the disk 159. The shutter curtain will now run down, causing an exposure (Fig. 24). As the shutter rewind gear 156 turns in a clockwise direction, the rewind interlock member 256 will be contacted by the pin 267 on the disk 159, near the end of the travel of the shutter curtain, and said rewind interlock member 256 will be caused to be turned in a contraclockwise direction until it is stopped from further movement by the bumper plate 268. The pin 327 will be disengaged from the notch 315, thus unlocking the shutter operating handle 39 and allowing the trigger locking member 321 to turn in a contraclockwise direction under the influence of the spring 323 when said shutter lever or trigger 40 is released, thus placing the hook 325 in the path of the pin 242 (Fig. 29). This will prevent the operation of said shutter release lever or trigger 40.

The said rewind interlock member 256 is provided, as explained, with notch 336 engaged by the pin 337 of the spring member 339 (Fig. 26). Said pin 337 will prevent the rewind interlock member 256 from rotating until the shutter has been completely rewound, and when the shutter is completely rewound, the pin 267 will override said spring 339, causing it to be moved in a downward direction, thereby withdrawing the pin 337 from the notch 336 (Fig. 35), thus allowing the rewind interlock member 256 to be turned in a clockwise direction under the influence of spring 272, and said shutter operating handle 39 is again locked from further movement, and said shutter release lever or trigger 40 is unlocked because hook 325 has been turned in a clockwise direction by the pin 327 on the rewind interlock member 256 (Fig. 13). Said rewind interlock member 256 is provided with the extension 270 having the prolongation 301 that overlies shutter rewind gear 156 when the shutter curtain is in its run-down condition, thus preventing the shutter rewind gear 156 from being moved out of engagement with pins 165 of the disk 159, to prevent changing shutter speeds at this time.

It will be noted that when the shutter is in its fully rewound condition, the shutter operating handle 39 is locked in the normal position. Said prolongation 301 is in a position to be out of engagement with the shutter rewind gear 156, and the hook 325 is in a position to allow the pin 242 to be turned in a clockwise direction. When the shutter is in its run-down condition (best shown in Fig. 28), said prolongation 301 overlies the shutter rewind gear 156. The pin 327 is disengaged from the notch 315, and the hook 325 is in position to prevent the turning of the pin 242, and therefore the shutter operating handle 39 can be moved in a contraclockwise direction for rewinding the shutter, but the shutter release lever or trigger 40 cannot be operated, nor can the shutter rewind gear 156 be disengaged from the pins 165, 165 for changing the shutter speed setting.

In order to make wholly clear the operation and function of the lock for the release lever 40, it is pointed out that in reality said release lever 40 is not locked by its own movement directly, but it becomes locked because said release lever 40 releases the shutter, and it is the shutter itself that in reality locks the release lever 40 after the said shutter has run all the way down. If the shutter were prevented from running down by any thing that served to hold the shutter curtain, said shutter release lever 40 would not be locked through the mere movement of said shutter release lever 40 to release the shutter curtain, but said release lever 40 would remain unlocked until the shutter curtain had been permitted to run all the way down.

This will be clear from a consideration of Fig. 13, particularly taken with Figs. 26 and 29. In Fig. 13, the shutter is shown as fully wound or tensioned ready for the making of an exposure and the operating handle 39 is locked through the fact that the pin 327 engages the notch 315 of the flange 313. The release lever 40 is at this time free to be operated because the projection 326 of the trigger interlock member 321 has been turned in a clockwise direction by the pin 327 of the lever 256 through the action of spring 272. The release lever 40 can now be turned in a clockwise direction for making an exposure, which movement of the release lever 40 will open the capping gates, disengage the gear 177 from the shutter rewind gear 156, and will withdraw the pawl 167 of the lever 168 from the notch 166, thus allowing the shutter to run down. The said shutter release lever 40 is not yet locked, nor does it become locked until the shutter rewind gear 156 runs all the way down and pin 267 operates lever 256, as indicated in Fig. 26, moving the pin 327 in a contraclockwise direction and allowing the trigger interlock member 321 to be moved in a contraclockwise direction under the influence of the spring 323.

If the shutter release lever 40 is now released, it will be caused to turn in a contraclockwise direction, and when it has returned to its starting position, the projection 325 of the interlock member 321 will be in the position shown in Fig. 29, wherein the shutter release lever 40 will be prevented from rotating in a clockwise direction because the pin 342 will be engaged by the projection 325 of the trigger interlock member 321. Therefore a second operation of the shutter release lever 40 will be prevented until the shutter is again rewound, at which time the pin 267 will engage the spring 339, withdrawing the pin 337 from the notch 336 of the lever 256. This is best shown in Fig. 35. The lever 256 will now be allowed to turn in a clockwise direction through the action of spring 272, and the pin 327 will engage the notch 315 of the flange 313, thus preventing any movement of the shutter operating or rewind handle 39 until the shutter release lever 40 has again been operated and the shutter has run all the way down, thus withdrawing pin 327 from the notch 315 of the flange 313, and, of course, when the shutter operating or rewind lever 39 is locked, the shutter release lever 40 is unlocked.

The rewind of the film or positioning of a new area of film for the next exposure has nothing to do directly with the locking or unlocking of the shutter release lever 40. Whenever the shutter is rewound, there is a new area of film fed into position, but actually the shutter release lever 40 is caused to be locked after the shutter has run all the way down, and by reason of such running down, and the shutter release lever 40 is released by the rewinding of the shutter curtain. This we believe to be wholly new in the art.

As hereinbefore set forth, the shutter operating handle 39 can be used for conditioning the camera for a second exposure by a series of strokes each shorter than 120°, due to the overrunning clutch in the handle mechanism. When a sufficient number of these short strokes has been made fully to rewind the shutter, thus placing the shutter rewind gear 156 in the position shown in Fig. 13, said shutter operating handle 39 can no longer be moved in a contraclockwise direction; neither can the shutter release lever or trigger 40 be operated, because the locking member 321 is in such a position that the said hook 325 is in the path of the pin 242 on the gear 240. The pin 337 has been withdrawn from the notch 336, but the rewind interlock member 256 will not return to the position shown in Fig. 13 until said shutter operating handle 39 has been moved in a clockwise direction to place the notch 315 in position to be engaged by the pin 327, thus allowing the rewind interlock member 256 to be turned in a clockwise direction by the spring 272, thus rotating the trigger locking member 321 to such a position that the hook-shaped member 325 is out of the path of pin 242. The shutter release lever or trigger 40 can now be operated, and the shutter operating handle 39 is locked in the position shown in Fig. 3.

It will be clear from the foregoing description that we have provided in a photographic camera which has means for supporting a film supply spool, a film take-up spool and a shutter, co-acting means for feeding the film and setting the shutter, a shutter release lever 40 for the shutter, and means by movement of which the act of making the exposure by shutter-releasing movement of said release lever thereupon locks said shutter release lever after each exposure to prevent further movement of said shutter release lever until, by said co-acting means, an unexposed area of film has been fed into position before the exposure opening and until the shutter has been reset for the next exposure. The disclosed mechanism includes the rewind interlock member 256 for the means for feeding the film and setting the shutter, and the trigger interlock member 321 for the shutter release means, and means for rendering alternately effective each of said interlock members to perform its interlocking function, upon the completion of the acts accomplished respectively by (a) the means for feeding the film and setting the shutter, and (b) the shutter releasing means. Thus there is provided means for rendering alternately effective each of the said interlock members and subsequently rendering in turn each of said interlock means ineffective. Each of said interlock members is rendered effective upon the accomplishment of the act performed by the functioning means for which such interlock member is provided, and when each of said interlock members is subsequently rendered ineffective by the accomplishment of the act performed by the other functioning means, for which the other interlock member is provided. Thus the disclosure includes means for rendering said interlock members reciprocally active and inactive in alternation.

It will be evident from the foregoing that the coacting means for feeding the film and setting the shutter includes a shutter operating handle 39 with means combining therewith, by movement of which the act of feeding the film and setting the shutter thereupon locks said shutter operating handle 39 and effects the unlocking of said shutter release lever 40.

It is often desirable to have means for recording data on the photographic negatives as exposures are made, and such recording means should be capable of permitting the operator readily to change data between exposures without fogging any negative. In order to accomplish this we have provided relatively simple means for photographing or recording information or other data on each negative at the time of exposure, using the light that passes through the lens for making the picture to illuminate the recording medium. The structure of the recording device will best be understood by reference to Fig. 39 and Figs. 43 to 47.

Reference is first made to Fig. 44 wherein is shown a top plan view of the stencil holder or film-recording tab holder, indicated generally at 36, and made up as an elongated T-shaped formation of sheet metal, provided with a handle 341 and two horizontally extending members 342, 342, shown in section in Fig. 47. Between said horizontally extending members 342, 342, is a spacer 343, held in place by means of rivets 344, 344, and said members 342 are provided with parallel, lengthwise extending lips 345, 346 shaped or bent around the spacer 343 and which provide a narrow opening for receiving a stencil 347 made of any suitable material such as cellulose acetate and having a translucent surface on which data can be written with an ordinary pencil.

The said stencil 347 is provided with openings 348, shown in Figs. 44 and 45 as engaged by a round head rivet 349 attached to the lip 346 which is provided with notches 350, 350 for the purpose of providing clearance for the rivet 349. The said structure provides ready means for holding the stencil 347 and one which is at the same time easily disengaged therefrom for replacement.

To the camera body is attached, as shown in Fig. 46, a light trap member made up of a hollow rectangular structure 351 having a retaining plate 352, said parts being held to the camera wall by screws 353, 353. In the hollow space 354 of the member 351 and a second hollow space 355 of the camera wall are placed two light valves 356, 356 which are desirably substantially the same as the light valves disclosed in the patent to Charles H. Roth, No. 2,056,144.

In Fig. 46 the index card holder is shown in place and therein the stencil 347 is shown as overlapping the aperture 85 and as under the sensitized material, Fig. 9. The said stencil 347 passes through a slot 357 of the aperture plate 85 and a second slot 358 in the aperture plate support member, as most clearly shown in Figs. 7, 9, 39 and 46. Over the said slot 358 is positioned a plate or strip 359 for the purpose of guiding the stencil 347 and holding the aperture plate 85 in position. The said plate 359 is attached to the aperture support member by screws 360, 360, and the plate 359 on the opposite side of the camera is similarly attached.

Fig. 43, constituting a horizontal section through the camera, most clearly indicates the position therein of the stencil holder or film-recording tab holder 36. Therein a glass plate 85a is used in the exposure opening instead of the regular aperture plate 85. The said stencil holder or film-recording tab holder can be placed in position for recording, or can be removed from its position, without admitting light to the sensitized film 89. In Fig. 39 the stencil holder or film-recording tab holder 36 has been entirely removed from the camera and the opening provided therefor has been closed by light valves 356, 356, thus excluding any light from passing to the sensitized material. In order to prevent light passing from the cone 23 and through the slot in plate 105 receiving the shutter operating arm or lever 250, there is provided, as best shown in Figs. 12, 14 and 39, a light guard 361 held to the camera walls by screws 362, 362.

The aerial camera herein disclosed is relatively simple in construction and presents no unusual manufacturing problems; it is a versatile, foolproof, convenient, and accurate mechanism for taking aerial photographs. A resume of the operation of the camera is as follows:

The camera is loaded with sensitized material as previously described and as indicated in Fig. 7. Enough film is wrapped on the take-up roller or spool 62 to ensure positive anchorage of the film spool core. The cover 21 is then placed on the camera and the indicator dial 41 (Fig. 40) is turned by the knob 226 until the letter S is in line, the index pointer being clearly shown in said figure. The operating handle 39 is then moved in a forward direction as far as it will go and is then returned to the position shown in Fig. 40. A series of short strokes can be given until the said handle 39 can no longer be moved forward, being in the position shown in Fig. 40. The said handle 39 is then moved to the starting position and is automatically locked in that position in the manner hereinbefore fully described. As the shutter is rewound, the shutter release lever or trigger 40 is automatically unlocked.

Inasmuch as on the exposure counter dial 41 the numeral 1 is not yet lined up with the index mark, it is necessary to repeat the said cycle until the numeral 1 does so line up. The camera will then be ready for the making of the first exposure. Following each operation of the handle 39, it is necessary to release the shutter release lever or trigger 40 in order to allow the curtain to run down and to unlock the operating handle 39 for a second operation. Normally, it requires about four of these cycles to bring the sensitized material before the exposure opening for the initial exposure. When the numeral 1 of the dial 41 and the operating handle 39 are in the position shown in Fig. 40, the camera will be ready for the making of a first exposure and the camera mechanism will be in the condition shown in Fig. 13.

In order to make an exposure, the shutter release lever or trigger 40 is moved in a clockwise direction until it reaches the end of its travel. The capping gates 96, 97 will then be opened and the shutter will be allowed to run down, making an exposure, and this action will unlock the operating handle 39 for rewinding film and for rewinding the shutter for a second exposure. In Fig. 24, the camera mechanism is shown with the shutter release lever or trigger 40 in the fully released position, the shutter curtain being run down all the way, the rewinding mechanism being unlocked and the film take-up spool ratchet disengaged. Upon the release of the said shutter release lever or trigger 40, the operating handle 39 can again be operated and the mechanism will again be in the condition shown in Fig. 28, where the shutter curtain is represented as partially rewound and the take-up spool 62 is winding film. When the shutter is fully rewound, the operating handle 39 can no longer be operated and the film spool will have previously been stopped from winding film, the mechanism being in the condition shown in Fig. 34.

All of the foregoing operations are entirely automatic, where so previously described, and it is impossible to operate the camera in any way excepting in the correct sequence of operation. This prevents double exposures and blank exposures. The shutter aperture can be changed only at the proper time—that is, when the shutter is in the fully rewound condition, thus preventing any injury to the shutter operating mechanism.

The herein disclosed camera can be operated by anyone with a minimum of instruction. The camera exactly as herein disclosed has been reduced to practice and the drawings accompanying and making a part of this application were made directly from one of several operating models that have been thoroughly tested by ourselves and also by members of the United States Army Air Corps.

Having thus described one illustrative embodiment of the invention, it is to be understood that although specific terms are employed, they are used in a generic and descriptive sense and not for purposes of limitation, the scope of the invention being set forth in the following claims.

We claim:

1. In an aerial photographic camera, a focal-plane curtain shutter, supporting means for a film supply spool, supporting means for a film take-up spool, film feeding means for advancing film for exposure, shutter-curtain rewinding means, including an operating pivoted handle 39 movable to and fro and operatively connected to the film feeding means, shutter release means including a pivoted shutter release lever 40 movable to and fro, means to lock said operating handle 39 after such feeding of film by the film feeding means, a rewind interlock member operated by the shutter exposure movement to unlock said shutter operating handle 39 and preventing further operation at such time of said shutter release lever 40, the said combination of parts insuring the proper positioning of the film and of the shutter before an exposure can be made, and preventing a second operation of said shutter release lever 40 until the focal plane shutter is rewound by movement of said operating handle 39.

2. In an aerial photographic camera, a shutter, supporting means for a film supply spool, supporting means for a film take-up spool, film feeding means for advancing film for exposure, shutter rewinding means, shutter release means, and means having a manually operable member cooperating through the shutter rewinding means and with the film feeding means and also with the shutter release means rendering it impossible to make a second operation of the manually operable member of the shutter release means until the shutter has been rewound by the shutter rewinding means and the film has been advanced for ensuing exposure.

3. In an aerial camera, supporting means for a film supply spool, supporting means for a film take-up spool, film feeding means for advancing film for exposure, shutter rewinding means, film positioning means above that portion of the film positioned for exposure, to hold the film in contact with the exposure aperture of the camera during the time of exposure, capping gate means mounted below the exposure aperture and means operatively connecting in movement said capping gate means and said film positioning means, thereby to cause closing movement of the capping gate means to lift the film positioning means from contact with the film.

4. In an aerial camera, having a body and a readily removable cover receivable on the upper part thereof, and wherein a readily removable film supply spool and a readily removable film take-up spool are used, and wherein a readily removable film pressure pad engaged and held in place by said cover is positioned directly under said film supply spool and said film take-up spool, supporting means for the film supply spool inside said cover including a supply spool bracket extending lengthwise of and above the supply spool and in immediate proximity to the inner face of said cover and upright end supporting members for said bracket rising from a supply base in the camera body, each of said latter members having a pivot formation to engage end holes in the supply spool, and permitting the ready positioning and removal of said film supply spool the specified construction permitting immediate access to and ready removal of said pressure pad upon removal of the cover and the film supply spool and the take-up spool.

5. In an aerial camera, having a body and a readily removable cover receivable on the upper part thereof, and wherein a readily removable film supply spool and a readily removable film take-up spool are used, and wherein a readily removable film pressure pad engaged and held in place by said cover is positioned directly under said film supply spool and said film take-up spool, supporting means for the film supply spool inside said cover including a supply spool bracket extending lengthwise of and above the supply spool and in immediate proximity to the inner face of said cover and upright end supporting members for said bracket rising from a supply base in the camera body, each of said latter members having a pivot formation to engage end holes in the supply spool, and permitting the ready positioning and removal of said film supply spool, said supply spool bracket having opposite end notches, and pins on the side portions of the camera body engageable with said notches the specified construction permitting immediate access to and ready removal of said pressure pad upon removal of the cover and the film supply spool and the take-up spool.

6. In an aerial camera, having a body and a readily removable cover receivable on the upper part thereof, and wherein a readily removable film supply spool and a readily removable film take-up spool are used, and wherein a readily removable film pressure pad engaged and held in place by said cover is positioned directly under said film supply spool and said film take-up spool, supporting means for the film supply spool including a supply spool bracket extending lengthwise of and above the supply spool and in immediate proximity to the inner face of said cover and upright end supporting members for said bracket rising from a supply base in the camera body, each of said latter members having a pivot formation to engage end holes in the supply spool, and permitting the ready positioning and removal of said film supply spool, said supply spool bracket being a channel member having opposite end notches, the camera body having side members with pins to engage said notches, the said detachable cover, when positioned, acting to hold said parts in place the specified construction permitting immediate access to and ready removal of said pressure pad upon removal of the cover and the film supply spool and the take-up spool.

7. In an aerial camera, a camera body having a lens cone member and having supporting means for a film supply spool and for a film take-up spool, so positioned as to provide a film path above the exposure aperture of the camera, and a pressure pad positioned directly above said film path and readily removable from the camera body, for which purpose the said pressure pad has at its opposite sides upwardly extending arms and the camera body at its sides has inwardly extending formations to engage said arm detachably.

8. In an aerial camera, a camera body having a lens cone member and having supporting means for a film supply spool and for a film take-up spool, so positioned as to provide a film path above the exposure aperture of the camera, a cover positionable over the said spools and readily attachable to and detachable from said camera body, and a pressure pad positioned directly above said film path and spring pressed against the film by the positioning of said cover, said pad having at its opposite sides upwardly extending arms, and the camera body adjacent said arms having inwardly extending formations with which said arms may be detachably engaged.

9. In an aerial camera, a camera body having a lens cone member and having supporting means for a film supply spool and for a film take-up spool, so positioned as to provide a film path above the exposure aperture of the camera, a pressure pad positioned directly above said film path and there supported for ready removal from the camera body, and for that purpose provided with upwardly extending arms, each having a hook formation, and means upon the camera body with which said hooks removably engage.

10. In an aerial camera, a camera body having a lens cone member and having supporting means for a film supply spool and for a film take-up spool, so positioned as to provide a film path above the exposure aperture of the camera, a pressure pad positioned directly above said film path and there supported for ready removal from the camera body, and for that purpose provided with upwardly extending arms, each having a hook formation, means upon the camera body with which said hooks removably engage, a cover positionable over the said spools and readily attachable to and detachable from said camera body, and spring means at the under side of the said cover and engaging the said upwardly extending arms when the cover is in position, so as to hold the pressure pad against the film during exposure.

11. In an aerial camera, a camera body having a lens cone member and having supporting means for a film supply spool and for a film take-up spool, so positioned as to provide a film path above the exposure aperture of the camera, a readily removable cover over said spools, a removable aperture plate supported for removal in the camera body directly under the film path for the substitution when desired of a glass plate and a pressure pad contacted with and held in place by said cover and supported from the walls of the camera body directly above the film path for ready removability from the camera body by manually lifting said pressure pad from its support at the camera walls upon removal of said body cover and the film supply spool and take-up spool to permit such lifting out of the pressure pad and then the making of such substitution, said film supply spool and film take-up spool being supported for ready removal directly above and in close proximity to said pad and when removed leaving said pad exposed for its own ready removal.

12. In an aerial camera, a camera body having attached at the lower part thereof a lens cone member and having in said camera body above said lens cone member supporting means for a film supply spool and for a film take-up spool, so positioned as to provide a film path in said body above the exposure aperture of the camera, there being positioned between the film path and the cone member a capping gate supporting member at the said lower part of said camera body where the cone member is attached and therefore adjacent said film path, constituting an apertured plate establishing at its edges a light-lock between the camera body and the lens cone member, and capping gates, to exclude from the film the light coming through the lens during the rewinding of the shutter, oppositely mounted for pivotal movement in the wall of said support member, so as to swing from horizontal, meeting, closed position downward to open position facing each other.

13. In an aerial camera, a camera body having attached at the lower part thereof a lens cone member and having in said camera body above said lens cone member supporting means for a film supply spool and for a film take-up spool, so positioned as to provide a film path in said body above the exposure aperture of the camera, there being positioned between the film path and the cone member a capping gate supporting member at the said lower part of said camera body where the cone member is attached and therefore adjacent said film path, constituting an apertured plate establishing at its edges a light-lock between the camera body and the lens cone member, and capping gates, to exclude from the film the light coming through the lens during the rewinding of the shutter, oppositely mounted for pivotal movement in the wall of said support member, so as to swing from horizontal, meeting, closed position downward to open position facing each other, the said support member having formations to exclude light.

14. In an aerial camera, a camera body having attached at the lower part thereof a lens cone member and having in said camera body above said lens cone member supporting means for a film supply spool and for a film take-up spool, so positioned as to provide a film path in said body above the exposure aperture of the camera, there being positioned between the film path and the cone member a capping gate supporting member at the said lower part of said camera body where the cone member is attached and therefore adjacent said film path, constituting an apertured plate establishing at its edges a light-lock between the camera body and the lens cone member, and capping gates, to exclude from the film the light coming through the lens during the rewinding of the shutter, oppositely mounted for pivotal movement in the wall of said support member, so as to swing from horizontal, meeting, closed position downward to open position facing each other, said support member having oppositely extending peripheral flanges to exclude light.

15. In an aerial camera, a camera body having a lens cone member, means for supporting a film for movement past an exposure aperture, a pressure pad supported above the film path at said aperture, capping gates mounted below the said aperture for movement from open to closed position, and vice versa, and means positioned to be engaged by said capping gates in their closing movement and engageable with said pressure pad, whereby closing movement of said capping gates lifts the pressure pad from contact with the film.

16. In an aerial camera, a camera body having a lens cone member, means for supporting a film for movement past an exposure aperture, a pressure pad supported above the film path at said aperture, capping gates to exclude from the film the light coming through the lens, pivotally mounted for that purpose between the film support and the said lens, for movement into open and closed position, and pressure pad lifting members positioned to be engaged by said capping gates in their closing movement and thereupon to engage and lift said pressure pad from contact with the film.

17. In an aerial camera, a camera body having a lens cone member, means for supporting a film for movement past an exposure aperture, a pressure pad supported above the film path at said aperture, capping gates to exclude from the film the light coming through the lens and for that purpose being positioned between the film support and said film, consisting of two plate-like members mounted for swinging movement into open and closed position, and upright rod-like pressure pad lifting members mounted in the camera body to be engaged by the capping gates in their closing movement and thereupon to lift the pressure pad from engagement with the film.

18. In an aerial camera, a camera body having a lens cone member, means for supporting a film for movement past an exposure aperture, a pressure pad supported above the film path at said aperture, capping gates to exclude from the film the light coming through the lens, pivotally mounted for that purpose between the film support and the said lens, for movement into open and closed position, pressure pad lifting members positioned to be engaged by said capping gates in their closing movement and thereupon to engage and lift said pressure pad from contact with the film, and a detachable cover having spring means to force the pressure pad down onto the film.

19. In a photographic camera having film feeding instrumentalities including a film supply spool, a film take-up spool and a measuring roller for determining the extent of film feed, and having shutter mechanism cooperating with the said film feeding instrumentalities, which shutter mechanism includes a single shutter curtain having a plurality of different-area apertures therein, a shutter curtain shaft having a shutter rewind gear thereon, the following train of mechanism, viz.: a shutter release disk, said shutter rewind gear and said disk being co-axial and disconnectible to permit turning of said shutter rewind gear to select a different curtain aperture, and having interengaging formations, and said disk having a peripheral notch to hold the said shutter curtain in said condition when fully wound, and a shutter release lever having a detent to engage said peripheral notch.

20. A combination according to claim 19, but in which there is provided shutter rewinding means including a rocker bar having a pinion to engage said shutter rewind gear and also having meshing idler gears 186, 189, and a film feed gear 190 meshing with said idler gear 189, said film feed gear being mounted on the take-up spool shaft and a ratchet wheel 196 to be held from rotation when the proper amount of film has been fed, said ratchet wheel being co-axial with said film feed gear.

21. A combination according to claim 19, but in which there is a film feed gear 190 and a clutch 199 and a ratchet wheel 196 all co-axially mounted said ratchet wheel constructed to be held from rotation when the proper amount of film has been fed, and said clutch permitting turning of said film feed gear when the film take-up is prevented from turning by said ratchet, and a train of gearing intermediate said film gear 190, and the said shutter rewind gear.

22. A combination according to claim 19, but in which there is provided a film feed gear 190 and a ratchet wheel 196 co-axial therewith, a train of gearing between said film feed gear and said shutter rewind gear, there being means to stop the rotation of said ratchet wheel to prevent further film feed when a predetermined amount of film has been fed by the said measuring roller.

23. A combination according to claim 19, but in which there is provided a film feed gear 190 and a ratchet wheel 196 co-axial therewith, a train of gearing between said film feed gear and said shutter rewind gear, there being means to stop the rotation of said ratchet wheel to prevent further film feed when a predetermined amount of film has been fed by the said measuring roller, said means for stopping the rotation of ratchet wheel 196 including a rocker arm 200 having a pawl to engage the teeth of said ratchet wheel.

24. In a photographic camera having film feed instrumentalities including a film supply spool, a film take-up spool and a measuring roller for determining the extent of film feed, and having shutter mechanism, and shutter rewinding mechanism cooperating with the said film feed instrumentalities, which shutter mechanism includes a single-curtain shutter having a plurality of different-area apertures therein, said shutter rewinding mechanism including a shutter rewind gear for said single curtain, a film feed gear 190 on the take-up spool shaft, a main drive gear mounted on a shaft-like support parallel with said spool shaft and meshing with said film feed gear, and adapted to rotate once for each film feed, a train of gearing between said film feed gear and said shutter rewind gear, a gear 205 on the shaft of the measuring roller, and an index gear 206 meshing with said gear 205 and having an index plate 207 and also having a notch 208, and a rocker arm 200 adapted to engage said notch at each complete revolution of said gear 206.

25. In a photographic camera having film feed instrumentalities including a film supply spool, a film take-up spool and a measuring roller for determining the extent of film feed, and having shutter mechanism, and shutter rewinding mechanism cooperating with the said film feed instrumentalities, which shutter mechanism includes a single-curtain shutter having a plurality of different-area apertures therein, said shutter rewinding mechanism including a shutter rewind gear 156, a gear 205 on the shaft of the measuring roller, an index gear 206 meshing with said gear 205, a film feed gear 190 on the take-up spool shaft, a main drive gear mounted on a shaft-like support parallel with said spool shaft and meshing with said film feed gear, and adapted to be rotated once for each film feed, a ratchet wheel 196 co-axial with said film feed gear for preventing further film feed when held from rotation, a train of gearing between said film feed gear 190 and the said shutter rewind gear, an index plate 207 rotatable with said index gear 206 to make one complete revolution for each revolution of the gear 206.

26. In a photographic camera having film feed instrumentalities including a film supply spool, a film take-up spool and a measuring roller 71 for determining the extent of film feed, said roller having a gear 205 and an index gear 206 driven thereby and having an index plate, said camera also having shutter mechanism, and shutter rewinding mechanism cooperating with the said film feed instrumentalities, and which shutter mechanism includes a single shutter curtain having a plurality of different-area apertures therein, a shutter rewind gear 156, means cooperating with said shutter rewind gear for selecting a different curtain aperture of the said single curtain, indicating means for shutter speed with interlocking means to prevent change in shutter speed until the shutter curtain has been restored to the position it had just prior to making the last exposure, a film feed gear 190, a main driving gear 211 meshing therewith and adapted to rotate once for each film feed, a train of gearing between the said film feed gear 190 and the said shutter rewind gear 156, a ratchet wheel 215 coaxial with said main driving gear 211, and a pawl to engage the teeth of said ratchet wheel to hold said main driving gear 211 from contraclockwise movement.

27. In a photographic camera having film feed instrumentalities including a film supply spool, a film take-up spool and a measuring roller for determining the extent of film feed, and having shutter mechanism, and shutter rewinding mechanism cooperating with the said film feed instrumentalities, and which shutter mechanism includes a single shutter curtain having a plurality of different-area apertures therein, a shutter rewind gear 156, a gear 205 on the shaft of the measuring roller, an index gear 206 meshing therewith and having an index plate, and means whereby the feeding of the proper film length for one exposure causes one revolution of said index plate.

28. In a photographic camera having film feed instrumentalities including a film supply spool, a film take-up spool and a measuring roller for determining the extent of film feed, and having shutter mechanism, and shutter rewinding mechanism cooperating with the said film feed instrumentalities, and which shutter mechanism includes a single shutter curtain having a plurality of different-area apertures therein, a shutter rewind gear 156, a gear 205 on the shaft of the measuring roller, a film feed gear 190, a main driving gear 211 meshing with said film feed gear 190 and adapted to rotate once for each film feed, means to prevent turning movement of said gear 211 in one direction, and means whereby said gear 205 is stopped from movement upon the making of one complete revolution and is released upon making of an exposure, thereby preventing further feeding of film until the intended next exposure is made.

29. A combination in a photographic camera including means for supporting a film supply spool and a film take-up spool, a shutter, coacting mechanism for feeding the film and rewinding the shutter and interrelated to compel feeding the film and rewinding the shutter before the next exposure can be made, said co-acting interrelated mechanism including a shutter rewind gear 156, a film feed gear 190 and a main drive gear 211, said combination also including a gear 177 mounted on a movable support and intermediate said gears 156 and 190, and means to lock said gear 177 periodically in mesh with said rewind gear 156.

30. A combination in a photographic camera including means for supporting a film supply spool and a film take-up spool, a shutter, coacting mechanism for feeding the film and operating the shutter and interrelated to compel feeding the film and rewinding the shutter before the next exposure can be made, said co-acting interrelated mechanism including a shutter rewind gear 156, a film feed gear 190, gearing intermediate said gears and including gear 177 on a movable support, said combination also including means to lock said gear 177 periodically in mesh with said rewind gear 156.

31. A combination according to claim 1, but wherein capping gate means are provided to exclude from the film when closed the light entering through the lens, and means are provided to lock said gates in closed position, and wherein there are operating connections from the said shutter release lever 40 to the capping gate means to unlock said capping gate means.

32. A combination in a photographic camera including means for supporting a film supply spool and a film take-up spool, a shutter, coacting mechanism for feeding the film and rewinding the shutter and interrelated to compel feeding the film and rewinding the shutter before the next exposure can be made, said co-acting interrelated mechanism including a shaft 251 having thereon a ratchet release member 257, a shutter operating lever 250 and a rewind interlock member 256, another shaft having a shutter release disk provided with a pin to operate said ratchet release member 257, a rocker arm link connected to said ratchet release member, a rocker arm pivoted to said link, a rotatable index plate having a formation to be engaged by said rocker arm and a film measuring roller about which passes the film from the film supply spool to the film take-up spool, said film measuring roller having a geared relation with said rotatable index plate.

33. A combination in a photographic camera including means for supporting a film supply spool and a film take-up spool, a shutter, coacting mechanism for feeding the film and operating the shutter and interrelated to compel feeding the film and rewinding the shutter before the next exposure can be made, said co-acting interrelated mechanism including a film feed gear 190 and a shutter rewind gear 156, and a shaft 251 having a crank member 254 thereon, said combination also including means moved by movement of said crank member 254 to engage and to disengage said shutter rewind gear from meshing relation with the said film feed gear.

34. A combination in a photographic camera including means for supporting a film supply spool and a film take-up spool, a shutter, coacting mechanism for feeding the film and operating the shutter and interrelated to compel feeding the film and rewinding the shutter before the next exposure can be made, said co-acting interrelated mechanism including a shutter rewind gear 156 and a film feed gear 190, and gearing intermediate said gears 156 and 190 including a gear 177, a movable bar 176 carrying said gear 177, and means to engage said bar 176 to lock said gear 177 in mesh with said gear 156.

35. A combination in a photographic camera including means for supporting a film supply spool and a film take-up spool, a shutter, coacting mechanism for feeding the film and rewinding the shutter and interrelated to compel feeding the film and rewinding the shutter before the next exposure can be made, said co-acting interrelated mechanism including a shaft 251 having thereon a ratchet release member 257, another shaft having thereon a shutter release disk provided with a pin that engages and moves said ratchet release member, a film measuring roller about which passes the film from said film support spool to the film take-up spool, a rotatable index plate having a geared relation to said measuring roller and provided with an engaging formation, and means operatively connected to said ratchet release member to engage said formation upon the rotatable index plate when operated by said ratchet release member.

36. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, said co-acting interrelated mechanism including both a film feed gear and a ratchet wheel which are co-axial with each other, said combination also including a shaft 251, a ratchet release member 257 mounted thereon, a link pivotally connected to said ratchet release member, a rocker arm 200 pivotally connected to said link and a pawl carried by said rocker arm to engage said ratchet wheel 196.

37. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, said co-acting interrelated mechanism including a shaft 251 having thereon a crank member 254, said combination also including a shutter rewind gear 156 and a film feed gear 190, there being interposed between said gears 156 and 190 a rocker bar 176 having thereon a gear 177 adapted to mesh with the said shutter rewind gear 156 together with means to lock said rocker bar with its gear 177 in mesh with said shutter rewind gear 156, said locking means including a lock member 234 positioned to be engaged by the said crank member 254 on said shaft 251.

38. A combination in a photographic camera including means for supporting a film supply spool and a film take-up spool, a shutter consisting of a single curtain having a plurality of different size apertures, co-acting mechanism for feeding the film and rewinding the shutter and interrelated to compel feeding the film and rewinding the shutter before the next exposure can be made, shutter release means, means having a manually operable member and cooperating through the shutter rewinding means and cooperating with the film feeding means, rendering it impossible to make a second operation of the manually operable member of the shutter release means until the shutter has been rewound by the shutter rewinding means and the film has been advanced for ensuing exposure, said co-acting interrelated mechanism including a shaft 251 having thereon a crank member 254, said combination also including a shutter rewind gear 156 and a film gear 190, and means engaging said rewind gear 156 to permit by manual manipulation the selection of a new curtain aperture for the next exposure, there being interposed between said gears 156 and 190 a rocker bar relatively remote from said shaft 251 and carrying a gear adapted to mesh with said shutter rewind gear 156, and means co-acting with said rocker bar to rock the same.

39. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, said co-acting interrelated mechanism including a shutter rewind gear 156 and a film feed gear 190, and interposed between said gears 156 and 190 an intermediate gear 177, a rocker bar carrying said gear 177, a shutter release lever 168, a disk 159 co-axial with said shutter rewind gear 156, a detent engageable with said disk 159 and carried by said shutter release lever 168, and means on said rocker bar to engage and move said shutter release lever 168.

40. A combination in a photographic camera including means for supporting a film supply spool and a film take-up spool, a shutter, co-acting mechanism for feeding the film and rewinding the shutter and interrelated to compel feeding the film and unwinding the shutter before the next exposure can be made, said co-acting interrelated mechanism including a shutter rewind gear 156 and a disk 159 co-axial with said rewind gear and rotating in unison therewith, and having a laterally projecting pin 267, film measuring mechanism with which the film engages between the supply spool and the take-up spool, and operating connections from said pin 267 to the film measuring mechanism to control the start of film measurement and for limiting the extent of the rotary movement of said disk 159, and consequently of the said shutter rewind gear 156 when the shutter reaches the end of its travel.

41. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, said co-acting interrelated mechanism including a shutter rewind gear 156 and a disk 159 co-axial with said rewind gear and rotating in unison therewith, and having a laterally projecting pin 267, film measuring mechanism with which the film engages between the supply spool and the take-up spool, and operating connections from said pin 267 to the film measuring mechanism to control the start of film measurement and for limiting the extent of the rotary movement of said disk 159, and consequently of the said shutter rewind gear 156 when the shutter reaches the end of its travel, the said co-acting, interrelated mechanism also including a shaft 251 having thereon a rewind interlock member 256 with which said pin 267 engages to move the latter.

42. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, shutter release means, means having a manually operable member and cooperating through the shutter rewinding means and cooperating with the film feeding means, rendering it impossible to make a second operation of the manually operable member of the shutter release means until the shutter has been rewound by the shutter rewinding means and the film has been advanced for ensuing exposure, said co-acting interrelated mechanism including a shutter rewind gear and a disk 159 co-axial with said gear and having disengaging means adapting them to rotate in unison therewith when connected together but manually separable for the purpose of selecting a new curtain aperture, said disk having a notch, a detent periodically engageable with said notch for holding said disk, and a main drive gear 211 positioned for rewinding the shutter until the said notch of the disk 159 is engaged by the said detent.

43. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, said co-acting interrelated mechanism including a shaft 251 having thereon a crank member 254, said combination also including a shutter rewind gear 156 and a film feed gear 190, there being positioned between the said gears 156 and 190 a rocker bar 176 having mounted thereon a gear 177 adapted periodically to mesh with the said shutter rewind gear 156, and means for locking the said rocker bar so that the gear 177 is in mesh with the said shutter rewind gear 156, said locking means including a lock member operated by the said crank member 254 and adapted to engage the said rocker bar 176.

44. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, said co-acting interrelated mechanism including a shutter rewind gear 156 and a film feed gear 190, together with gearing intermediate said gears 156 and 190, including gear 177, and means periodically to lock the said gear 177 so as to intermesh with the said shutter rewind gear 156.

45. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, said co-acting interrelated mechanism including a shutter rewind gear 156, a film feed gear 190, gearing connecting said gears, including gear 177, and means periodically to lock and to unlock said gear 177 in and from meshing relation with said shutter rewind gear 156 said means including rocker arm 176 whereon said gear 177 is mounted, a rocker arm lock lever 234 having a formation to engage the rocker arm 176, means to hold said lever 234 in engagement with said rocker arm 176 so that gears 177 and 156 are in mesh, and means periodically to move said rocker arm lock lever 234 in opposition to such holding means, thereby to effect unlocking of the said rocker arm 176 and permitting the disengagement of said gear 177 and the shutter rewinding gear 156.

46. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, the said co-acting interrelated mechanism including a shutter rewind gear 156, a film feed gear 190 and gearing connecting said gears, including gear 177, and means for disengaging said gear 177 from said shutter rewind gear and means to release the shutter, such means including a shutter release lever 40, said shutter release lever having to and fro movement upon pivot 243, interlock means co-acting with said shutter release lever and positively associated with the exposure movement of the shutter, to render it impossible to make a second exposure operation of the shutter release lever on its pivot 243 until the shutter has been rewound, the return movement of such shutter release lever to its starting position, allowing the said shutter rewind gear 156 to be acted upon for rewinding the shutter for the next exposure.

47. In a photographic camera having means for supporting a film supply spool and a film take-up spool, and having a shutter, co-acting mechanism for feeding the film and operating the shutter and interrelated to compel feeding the film and rewinding the shutter before the next exposure can be made, said co-acting interrelated means including means for the selection of a different shutter, aperture for a different shutter speed, such means including a shutter setting knob, shutter rewind gear 156 having a laterally projecting pin, a disk 159 having a hole to receive said pin, gear 177 to mesh with said shutter rewind gear 156, said gears being disengageable, and means to hold disk 159 stationary, when said gears 156 and 177 are disengaged, and while said gear 156 is being turned to select a different shutter aperture.

48. In a photographic camera having means for supporting a film supply spool and a film take-up spool, and having a shutter, co-acting mechanism for feeding the film and operating the shutter and interrelated to compel feeding the film and rewinding the shutter before the next exposure can be made, said co-acting interrelated means including means for the selection of a different shutter, aperture for a different shutter speed, such means including a shutter setting knob, shutter rewind gear 156 having a laterally projecting pin, a disk 159 having a hole to receive said pin, gear 177 to mesh with said shutter rewind gear 156, and means to hold disk 159 stationary, and while said gear 156 is being turned to select a different shutter aperture, said shutter rewind gear 156 being slidable axially by manipulation of the shutter setting knob to disengage said gears 156 and 177.

49. In a photographic camera having means for supporting a film supply spool and a film take-up spool, and having a shutter, co-acting mechanism for feeding the film and operating the shutter and interrelated to compel feeding the film and rewinding the shutter before the next exposure can be made, said co-acting interrelated means including means for the selection of a different shutter, aperture for a different shutter speed, such means including a shutter setting knob, shutter rewind gear 156 having a laterally projecting pin, a disk 159 having a hole to receive said pin, gear 177 to mesh with said shutter rewind gear 156, said gears being disengageable, means to hold disk 159 stationary when said gears 156 and 177 are disengaged, and while said shutter rewind gear 156 is being turned to select a different shutter aperture, and an index gear 284 in train with said shutter rewind gear 156, and an index plate 286 at said gear 156.

50. In a photographic camera having means for supporting a film supply spool and a film take-up spool, and having a shutter, co-acting mechanism for feeding the film and operating the shutter and interrelated to compel feeding the film and rewinding the shutter before the next exposure can be made, said co-acting interrelated means including means for the selection of a different shutter, aperture for a different shutter speed, such means including a shutter setting knob, shutter rewind gear 156 having a laterally projecting pin, a disk 159 having a hole to receive said pin, gear 177 to mesh with said shutter rewind gear 156, said gears being disengageable, and means to hold disk 159 stationary, when said gears 156 and 177 are disengaged, and while said shutter rewind gear 156 is being turned to select a different shutter aperture, and means to prevent over-adjusting movement of the shutter by said shutter setting knob.

51. In a photographic camera having means for supporting a film supply spool and a film take-up spool, and having a shutter, co-acting mechanism for feeding the film and operating the shutter and interrelated to compel feeding the film and rewinding the shutter before the next exposure can be made, said co-acting interrelated means including means for the selection of a different shutter, aperture for a different shutter speed, such means including a shutter setting knob, shutter rewind gear 156 having a laterally projecting pin, a disk 159 having a hole to receive said pin, gear 177 to mesh with said shutter rewind gear 156, said gears being disengageable, means to hold disk 159 stationary, when said gears 156 and 177 are disengaged, and while said shutter rewind gear 156 is being turned to select a different shutter aperture, and means to prevent over-adjusting movement of the shutter by said shutter setting knob, said means including a movable detent plate 295 having a projection, an index gear 284 in train with said shutter rewind gear 156 and having a formation to be engaged by said projection of the index plate 295 to prevent undue movement.

52. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, co-acting means for the selection of a different shutter aperture for a different shutter speed, and means to prevent a change of shutter speed when the shutter is run down.

53. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, co-acting means for the selection of a different shutter aperture for a different shutter speed, and means to prevent a change of shutter speed when the shutter is run down, said last mentioned means including shaft 251 having interlock member 256, and a shutter rewind gear 156 with which said interlock member cooperates.

54. A combination in a photographic camera including means for supporting a film supply spool and a film take-up spool, a shutter, co-acting mechanism for feeding the film and rewinding the shutter and interrelated to compel feeding the film and rewinding the shutter before the next exposure can be made, co-acting means for the selection of a different shutter aperture for a different shutter speed, and means to prevent a change of shutter speed when the shutter is run down, said last mentioned means including shaft 251 having interlock member 256, a shutter rewind gear 156 with which said interlock member cooperates, and shutter setting knob 37 held from turning movement by said interlock member.

55. In a photographic camera having means for supporting a film supply spool and a film take-up spool, and having a focal plane shutter, co-acting means for feeding the film and rewinding said focal plane shutter, a shutter release lever 40 for releasing the said shutter for making an exposure, and means moved through movement of the said shutter as it runs down following such release thereof, and acting during the making of such exposure, for locking said shutter release lever 40 against a second operation thereof in an exposure-making direction until after the said focal plane shutter has been completely rewound by the rewinding means.

56. A combination according to claim 55, but in which the means to lock said shutter release lever includes a gear 240 having a pin 242, and trigger interlock member 321 having a part to engage said pin.

57. A combination according to claim 55, but in which the means to lock said shutter release lever includes a gear 240 having a pin 242, and trigger interlock member 321 having a hook 325 to engage said pin 242, and a finger 326, a pin 327 to engage said finger 326, and rewind interlock member 256 carrying said pin 327.

58. In an aerial camera, a camera body having an objective lens supported therein, means for supporting a film for movement past an exposure aperture, a pressure pad supported above the film path at said aperture, capping gate means mounted below said aperture for movement from open to closed position, and vice versa, and means positioned to be operated by the said capping gate means in the closing movement thereof and engageable with said pressure pad, whereby closing movement of said capping gate means lifts the pressure pad from contact with the film.

59. In an aerial camera, a combination in accordance with claim 2, but wherein capping gates are provided to exclude from the film light entering through the objective lens, and wherein means are provided operatively connecting the film feeding means and the shutter rewind means, thereby to lock the said capping gates in closed position while the film is being fed and the shutter is rewound and to unlock said gates for film exposure.

60. An aerial camera according to claim 2, but wherein capping gates are provided to exclude from the film light coming through the objective lens, and wherein means are provided operatively connecting the film feeding means and the shutter rewind means, thereby to lock the said capping gates in closed position while the film is being fed and the shutter is rewound, and to unlock said gates for film exposure, and wherein means are provided to open and to close said capping gates.

61. In an aerial camera, a camera body having an objective lens supported therein, means for supporting a film for movement past an exposure aperture, film feeding means, a curtain shutter, curtain shutter releasing means, curtain shutter rewinding means, the said camera body having between the film supporting means and the objective lens a capping-gate support member that is secured to said camera body, a pair of capping gates oppositely pivotally mounted upon said support member to swing from horizontal, meeting, closed position downward to open position facing each other means operatively connected to the film feeding means and the shutter rewinding means to lock said capping gates in closed position while the film is being fed and the shutter rewound and to unlock said gates for film exposure, and means having a manually operable member cooperating through the rewinding means and cooperating with the film feeding means and the shutter releasing means, rendering it impossible to make a second operation of the said manually operable member of the shutter releasing means until the shutter has been rewound and the film has been advanced.

62. In a photographic camera having film feed instrumentalities including a film supply spool, a film take-up spool and a measuring roller for determining the extent of film feed and having shutter mechanism cooperating with the said film feed instrumentalities, which shutter mechanism includes a single shutter curtain having a plurality of different-area apertures therein; a shutter rewind gear for said single shutter curtain, a film feed gear on the shaft of the take-up spool, a main drive gear meshing with said film feed gear, a train of gearing between said film feed gear and said shutter rewind gear, a gear on the shaft of the measuring roller, an index gear meshing with said last mentioned gear and having an index plate, and also having a notch and a rocker arm adapted to engage said notch at each rotation of the gear on the shaft of the measuring feed roller.

63. A combination according to claim 3, but wherein there is provided lifting means for the film positioning means including upright, pin-like lifting members 113 operated by the capping means to lift said film positioning means from contact with the film.

64. In an aerial camera, supporting means for a film supply spool, supporting means for a film take-up spool, film feeding means for advancing film for exposure, shutter rewinding means, film positioning means above that portion of the film positioned for exposure to hold the film in contact with the exposure aperture of the camera during the time of exposure, and lifting means for the film positioning means including a capping gate structure mounted between the film and the objective lens to exclude light from the film except during the time of exposure, and in the closing movement thereof engaging said lifting means to move the film positioning means out of contact with the film.

65. In an aerial camera, supporting means for a film supply spool, supporting means for a film take-up spool, film feeding means for advancing film for exposure, shutter rewinding means, film positioning means above that portion of the film positioned for exposure to hold the film in contact with the exposure aperture of the camera during the time of exposure, a pair of capping gates mounted between the film and the lens and acting, when closed, to exclude light through the lens from the film, and pad lifting members 113, 113 engaging the film positioning means and moved upward by the capping gates in their closing operation, thereby lifting said film positioning means.

66. In a photographic camera having means for supporting the film supply spool and a film take-up spool and having a shutter, co-acting means for feeding the film and operating the shutter, a shutter release lever 40 for the shutter, a gear 240 carrying said release lever, a pair of pivoted capping gates to exclude light coming through the lens from the film, and operating connections from said gear 240 to said capping means, whereby movement of said shutter release lever in one direction opens the capping gates.

67. In a photographic camera having means for supporting a film supply spool and a film take-up spool and having a shutter, co-acting means for feeding the film and operating the shutter, a gear 240 for operating said co-acting means, a shutter release lever 40 carried by said gear 240, a pair of pivoted capping gates for excluding from the film the light entering through the lens, and link-like connecting members 111, 111 operatively connected to said capping gates and operated by movement of said gear 240.

68. In a photographic camera having means for supporting a film supply spool and a film take-up spool and having a shutter, co-acting means for feeding the film and operating the shutter, a gear 240 in meshing relation with said co-acting means and having a shutter release lever 40, a pair of pivoted capping gates to exclude from the film the light entering through the lens, a capping-gate actuating disk 112, links connecting said disk 112 to said capping gates, and operating connections from said disk 112 to said gear 240.

69. In a photographic camera having means for supporting a film supply spool and a film take-up spool and having a shutter, co-acting means for feeding the film and operating the shutter, a gear 240 in meshing relation with said co-acting means and having a shutter release lever 40, a pair of pivoted capping gates to exclude from the film the light entering through the lens, a capping-gate actuating disk 112, a shaft 245 whereon said actuating disk is mounted, said shaft also having a gear 246 meshing with said gear 240, whereby movement of said shutter release lever 40 in one direction opens said capping gates.

70. In an aerial camera, supporting means for a film supply spool, supporting means for a film take-up spool, film feeding means for advancing film for exposure, capping gate means including means to open such gate for film exposure and then to close such gate, film positioning means above that portion of the film positioned for exposure to hold the film in contact with the exposure aperture of the camera during the time of exposure, lifting means supported below such positioned portion of the film to engage said film positioning means so as to lift the same when operated, and means positively structurally associated with the closing of the gate following film exposure to operate said lifting means periodically, thereby to lift the film positioning means out of contact periodically with the film.

71. In an aerial camera, supporting means for a film supply spool, supporting means for a film take-up spool, film feeding means for advancing film for exposure, a shutter, a shutter release trigger 40 therefor, shutter rewinding means, film positioning means above that portion of the film positioned for exposure to hold the film in contact with the exposure aperture of the camera during the time of exposure, lifting means supported below such positioned portion of the film to engage said film positioning means so as to lift the same when operated, capping gate means mounted below the exposure aperture and operatively related to said lifting means, thereby to cause closing movement of said capping gate means to lift said film positioning means from contact with the film.

72. In an aerial camera, supporting means for a film supply spool, supporting means for a film take-up spool, film feeding means for advancing film for exposure, a shutter, a shutter release trigger 40 therefor, shutter rewinding means, a film pressure pad above that portion of the film positioned for exposure to hold the film in contact with the exposure aperture of the camera during the time of exposure, pressure pad-lifting means located below such positioned portion of the film to engage said film pressure pad so as, when operated, to lift said pressure pad out of contact with the film, and capping gate means below the exposure aperture to act upon said pressure pad lifting means, thereby to lift the pressure pad in the closing of said capping gate means.

73. An aerial camera according to claim 72, but wherein the said operating connections include capping gates for excluding light from the film when the shutter is being reset, and also include parts intermediate said capping gates and said pressure pad to lift said pressure pad off said film when said capping gates close.

74. An aerial photographic camera having a casing provided with means to support an objective lens, and provided with a transversely extending wall at substantially the focal plane, said wall being apertured for the passage of light rays to the sensitized surface, said casing having two opposite, upright, side members extending substantially above said transversely extending wall, a casing cover, adapted to be opened and closed, supported upon the upper end of said casing, and combining with said upright side members to provide a chamber to enclose the film, a removable film-supply spool-receiving member supported within said chamber above said transversely extending wall, a removable film take-up spool, means within said chamber for guiding the film for exposure in substantially the focal plane along said apertured transverse wall from said supply spool to said take-up spool, and a removable pressure pad adapted to be received upon the film above the aperture of said transversely extending wall, and having upwardly extending arms adapted to be removably supported by the said upright side members, the said casing cover being provided with spring means on the inside thereof, so located that when the said cover is positioned, downward pressure is thereby applied to the said arms of the pressure pad to force said pressure pad against that portion of the film that is positioned for exposure.

75. An aerial photographic camera in accordance with claim 2, but wherein the shutter is a focal-plane curtain shutter, and wherein, for rewinding the said shutter and for feeding the film, there is provided a pivoted lever 39 having a swinging movement to effect such functions, and wherein for releasing the said shutter there is provided a pivoted lever 40 having a swinging movement for effecting such shutter release.

76. An aerial photographic camera in accordance with claim 2, but wherein the shutter is a focal-plane curtain shutter, and wherein, for rewinding the said shutter and for feeding the film, there is provided a pivoted lever 39 having a swinging movement to effect such functions, and wherein for releasing the said shutter there is provided a pivoted lever 40 having a swinging movement for effecting such shutter release, and wherein said pivoted lever 39 must, after its swinging movement to rewind the shutter and to feed the film, be swung back to its starting position before the pivoted lever 40 can be released to perform its function of releasing the shutter.

77. An aerial photographic camera in accordance with claim 2, but wherein the shutter is a focal-plane curtain shutter, and wherein, for rewinding the said shutter and for feeding the film, there is provided a pivoted lever 39 having a swinging movement to effect such functions, and wherein for releasing the said shutter there is provided a pivoted lever 40 having a swinging movement for effecting such shutter release, and wherein said pivoted lever 39 must, after its swinging movement to rewind the shutter and to feed the film, be swung back to its starting position before the pivoted lever 40 can be released to perform its function of releasing the shutter, and wherein for such purpose and result there is provided an interlock 325 for the said pivoted lever 40, and wherein there is provided means operated by such return swinging movement of said pivoted lever 39 to disengage said interlock 325, and thus permit shutter releasing swinging movement of said pivoted lever 40.

78. An aerial photographic camera in accordance with claim 2, but wherein the shutter is a focal-plane curtain shutter, and wherein, for rewinding the said shutter and for feeding the film, there is provided a pivoted lever 39 having a swinging movement to effect such functions, and wherein for releasing the said shutter there is provided a pivoted lever 40 having a swinging movement for effecting such shutter release, and wherein said pivoted lever 39 must, after its swinging movement to rewind the shutter and to feed the film, be swung back to its starting position before the pivoted lever 40 can be released to perform its function of releasing the shutter, and wherein for such purpose and result there is provided an interlock 325 for the said pivoted lever 40, and wherein there is provided means operated by such return swinging movement of said pivoted lever 39 to disengage said interlock 325, and thus permit shutter releasing swinging movement of said pivoted lever 40, and wherein there is also provided a rocker arm 256 having a pin 327 and a flanged hub 312, 313 having a notch 315 to be engaged by said pin 327.

79. In a photographic camera, supporting means for a film supply spool, supporting means for a film take-up spool, film feeding means for advancing film for exposure, film positioning means to hold the film in contact with the exposure aperture of the camera during the time of exposure, a shutter, shutter releasing means, shutter rewinding means, capping gate means below the exposure aperture, and means operatively connecting in action said shutter releasing means and said film positioning means and said capping gate means and operatively connected to and timed in action with said film feeding means and said shutter rewinding means and said capping gate means, to cause said contact of the film positioning means and the film to take place at the time the shutter is released for exposure by said shutter releasing means and the capping gate means are opened.

80. In a photographic camera, supporting means for a film supply spool, supporting means for a film take-up spool, film feeding means for advancing film for exposure, film positioning means to hold the film in contact with the exposure aperture of the camera during the time of exposure, a shutter, shutter releasing means, shutter rewinding means, and means operatively connecting in action said shutter releasing means and said film positioning means and operatively connected to and timed in action with said film feeding means and said shutter rewinding means, to cause said contact of the film positioning means and the film to take place at the time the shutter is released for exposure by said shutter releasing means, and interlocking means for the shutter releasing means to lock said shutter releasing means in non-releasing position, and thereby serving also, through said means operatively connecting in action the shutter releasing means and the film positioning means and the shutter rewinding means, to lock said film positioning means out of contact with the film until the said shutter releasing means is itself unlocked and operated to release the shutter.

81. A photographic camera in accordance with claim 79, but wherein said film positioning means is positively maintained out of contact with the film by said capping gate means at all times excepting during film exposure ensuing upon shutter release.

82. A combination in accordance with claim 12, but wherein there are provided film feeding means to feed the film along said film path, a shutter, shutter release means, shutter rewinding means, and locking means to lock said capping gates in closed position during shutter rewinding and film feeding.

83. A photographic camera in accordance with claim 55, but wherein capping gate means are movably mounted in the camera to exclude from the film light entering through the lens when the shutter is being rewound, and wherein there are operating connections from the said capping gate means to the shutter release lever 40, whereby the movement of said shutter release lever 40 in one direction opens the capping gate means.

84. A photographic camera in accordance with claim 55, but wherein the act of rewinding the focal-plane shutter unlocks the said shutter release lever 40.

85. A photographic camera in accordance with claim 55, but wherein means are provided whereby the said shutter release lever 40 cannot be operated a second time in an exposure-making direction until after an unexposed area of film has been fed into position before the exposure opening.

86. A photographic camera in accordance with claim 55, but wherein there is a shutter operating handle 39, and wherein there is means to lock said operating handle 39 following each feeding of the film and the rewinding of the shutter until after the next exposure.

87. A photographic camera in accordance with claim 55, but wherein there is a shutter operating handle 39 and means to lock the same, and wherein the performance of each act of film feeding and shutter rewinding causes the unlocking of the said shutter release lever 40, and the performance of each act of releasing the said shutter causes the unlocking of the shutter operating handle 39.

88. A photographic camera in accordance with claim 55, but wherein there is a shutter operating handle 39 and a rewind interlock member 256 therefor, and an interlock member 321 for the release lever 40, and wherein there are coacting means rendering alternately effective each of the said lock members to perform its interlocking function upon the completion of the acts accomplished, respectively, by (a) the means for feeding the film and setting the shutter, and (b) the shutter releasing means.

89. A photographic camera in accordance with claim 55, but wherein there is a shutter operating handle 39 and a rewind interlock member 256 therefor, and an interlock member 321 for the release lever 40, and wherein there are coacting means for rendering alternately effective each of said lock members and subsequently rendering in turn each of said lock members ineffective.

90. A photographic camera in accordance with claim 55, but wherein there is a shutter operating handle 39 and a rewind interlock member 256 therefor and an interlock member 321 for the release lever 40, and wherein there are coacting means for rendering said lock members reciprocally active and inactive in alternation.

91. A photographic camera in accordance with claim 55, but wherein there is a shutter operating handle 39 and a rewind interlock member 256 therefor and an interlock member 321 for the release lever 40, and wherein there are combining means by movement of which the rewinding of the shutter locks the shutter operating handle 39 and thus effects the unlocking of the said shutter release lever 40.

92. A photographic camera in accordance with claim 55, but wherein there is a shutter operating handle 39 and a lever 256 having a pin 327, and a part having a flange 313 provided with a notch 315 to be engaged by said pin 327, thereby to lock the said shutter operating handle 39.

93. A photographic camera in accordance with claim 55, but wherein, for locking the shutter release lever 40, there is provided an interlock member 321 having a projection 325, and there is provided a pin 242 upon the shutter release lever 40 to be engaged by said projection 325, and wherein the member 321 is mounted for turning movement.

94. A photographic camera in accordance with claim 55, but wherein, for locking the shutter release lever 40, there is provided an interlock member 321 having a projection 325, and there is provided a pin 242 upon the shutter release lever 40 to be engaged by said projection 325, and wherein the member 321 is mounted for turning movement, the said lock member 321 having cooperating therewith to turn the same a spring 323.

95. A photographic camera in accordance with claim 55, but wherein there is provided means for unlocking the shutter release lever 40 after the shutter has been rewound and film has been fed, such unlocking means including a pin 267 upon a shutter rewind gear, a spring 339 to be engaged by said pin 267, a lever 256 having a notch 336, and wherein the pin 267 withdraws the pin 337 from said notch 336.

96. A photographic camera in accordance with claim 55, but wherein the means moved by movement of the shutter as it runs down includes a shutter rewind gear 156 having a pin 267, and wherein there is a part engaged by said pin 267 when the shutter is fully run down to operate the lock for the shutter release lever 40 against the specified second operation thereof.

97. A photographic camera provided with a shutter, means for supporting a film, film feeding means for advancing such film for exposure, shutter rewinding means, shutter release means and means having a manually operable member cooperating through the shutter rewinding means and also with both the film feeding means and the shutter release means, rendering it impossible to make a second operation of such manually operable member of the shutter release means until the shutter has been rewound by the shutter rewinding means and the film has been advanced for the next exposure.

98. A photographic camera provided with means for supporting a film and for feeding the same intermittently into exposure position, a curtain shutter, means for rewinding the said curtain shutter, shutter release means including a manually operable shutter release lever 40 for releasing said shutter for making an exposure, movable interlock means for said release lever 40 moved into locking position only by, directly through and during exposure movement of the said shutter as it runs completely down following the release thereof, thereby locking said shutter release lever 40 against a second operation of said release lever 40 in an exposure-making direction until an unexposed area of film has been fed into exposure position.

ARCHIE H. GOREY.
LOUIS D. NADEL.
EDSON S. HINELINE.